United States Patent
Motoyama

(10) Patent No.: US 8,121,958 B2
(45) Date of Patent: Feb. 21, 2012

(54) APPROACH FOR DETERMINING ALTERNATIVE PRINTING DEVICE ARRANGEMENTS

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 268 days.

(21) Appl. No.: 12/480,491

(22) Filed: Jun. 8, 2009

(65) Prior Publication Data

US 2010/0312600 A1   Dec. 9, 2010

(51) Int. Cl.
- G06F 17/00 (2006.01)
- G06F 15/00 (2006.01)
- G06F 3/12 (2006.01)

(52) U.S. Cl. .................. 705/400; 358/1.9; 358/1.15

(58) Field of Classification Search .......... 705/400, 705/7.11, 7.12, 7.13, 7.35; 710/6, 8, 15, 710/16, 38; 709/225, 226; 718/102, 104; 358/1.9, 1.15

See application file for complete search history.

(56) References Cited

U.S. PATENT DOCUMENTS

| | | |
|---|---|---|
| 5,086,385 A | 2/1992 | Launey et al. |
| 5,156,203 A | 10/1992 | Funakoshi et al. |
| 5,305,952 A | 4/1994 | Hannarong |
| 5,682,949 A | 11/1997 | Ratcliffe et al. |
| 5,900,026 A | 5/1999 | Ryu |
| 5,954,820 A | 9/1999 | Hetzler |
| 5,962,989 A | 10/1999 | Baker |
| 6,260,111 B1 | 7/2001 | Craig et al. |
| 6,263,260 B1 | 7/2001 | Bodmer et al. |
| 6,297,746 B1 | 10/2001 | Nakazawa et al. |
| 6,348,867 B1 | 2/2002 | Myllymäki |
| 6,349,883 B1 | 2/2002 | Simmons et al. |
| 6,408,395 B1 | 6/2002 | Sugahara et al. |
| 6,415,387 B1 | 7/2002 | Aguilar et al. |
| 6,594,767 B1 * | 7/2003 | Wiley et al. .............. 713/300 |
| 6,642,843 B2 | 11/2003 | Satoh |
| 6,715,088 B1 | 3/2004 | Togawa |
| 6,789,208 B2 | 9/2004 | Noda et al. |
| 6,867,699 B2 | 3/2005 | Curwen et al. |
| 6,870,477 B2 | 3/2005 | Gruteser et al. |
| 6,909,367 B1 | 6/2005 | Wetmore |
| 7,046,383 B1 * | 5/2006 | Ueda et al. .............. 358/1.15 |
| 7,800,768 B2 * | 9/2010 | Yamada .................. 358/1.13 |
| 7,859,692 B2 * | 12/2010 | Snyderman et al. ......... 358/1.13 |
| 8,009,312 B2 * | 8/2011 | Katoh et al. .............. 358/1.15 |
| 2002/0010854 A1 | 1/2002 | Ogura et al. |
| 2003/0058923 A1 | 3/2003 | Chen et al. |
| 2003/0088528 A1 * | 5/2003 | Parry ....................... 706/1 |

(Continued)

FOREIGN PATENT DOCUMENTS

EP          0 838 791 A2     4/1998

(Continued)

*Primary Examiner* — Igor Borissov

(74) *Attorney, Agent, or Firm* — Hickman Palermo Truong & Becker LLP; Edward A. Becker

(57) ABSTRACT

According to one embodiment of the invention, an approach is provided for determining alternative printing device arrangements. In general, the geographic locations, usage and costs of an existing set of printing devices are analyzed. A determination is made, based upon this analysis, whether one or more of the existing printing devices can be replaced by one or more replacement printing devices to provide an alternative printing device arrangement that has lower costs. The lower costs may reflect lower operational costs, lower energy costs, lower acquisition costs, or any combination of lower operational costs, lower energy costs and lower acquisition costs.

20 Claims, 17 Drawing Sheets

U.S. PATENT DOCUMENTS

| | | |
|---|---|---|
| 2003/0171851 A1 | 9/2003 | Brickfield et al. |
| 2003/0231328 A1* | 12/2003 | Chapin et al. ................ 358/1.13 |
| 2005/0036467 A1 | 2/2005 | Kubler et al. |
| 2005/0102442 A1* | 5/2005 | Ferlitsch ........................ 710/15 |
| 2005/0130653 A1 | 6/2005 | Bisdikian et al. |
| 2005/0190392 A1* | 9/2005 | Carroll ........................ 358/1.13 |
| 2005/0204177 A1 | 9/2005 | Watts et al. |
| 2006/0028681 A1* | 2/2006 | Aagesen ..................... 358/1.15 |
| 2006/0176515 A1* | 8/2006 | Ueda et al. .................. 358/1.15 |
| 2006/0221380 A1* | 10/2006 | Pretz et al. ................... 358/1.15 |
| 2008/0030766 A1* | 2/2008 | Snyderman et al. ......... 358/1.15 |
| 2008/0239366 A1* | 10/2008 | Cyman et al. ............... 358/1.15 |
| 2009/0287806 A1* | 11/2009 | Hamilton et al. ............. 709/223 |
| 2010/0153145 A1* | 6/2010 | Klassen ........................... 705/7 |
| 2011/0191131 A1* | 8/2011 | Katoh et al. ................. 705/7.11 |

FOREIGN PATENT DOCUMENTS

| | | |
|---|---|---|
| GB | 2 194 088 | 2/1988 |
| JP | 11-249765 | 9/1999 |
| WO | WO 02/13218 A1 | 2/2002 |

* cited by examiner

| NETWORK DEVICE | ASSOCIATED USERS |
|---|---|
| 252 | D1; D2; D3; D4 |
| 254 | C1; C2; C3; C4; C5 |
| 256 | A1; A2; A3; A4; A5; A6 |
| 258 | B1; B2; B3; B4; B5 |

| DEPT (702) | VECTOR OF LIGHT (704) | VECTOR OF IDs (706) |
|---|---|---|
|  |  |  |
|  |  |  |
|  |  |  |
|  |  |  |

| DEPT (710) | VECTOR OF PERIPHERALS (712) | VECTOR OF IDs (714) |
|---|---|---|
|  |  |  |
|  |  |  |
|  |  |  |
|  |  |  |

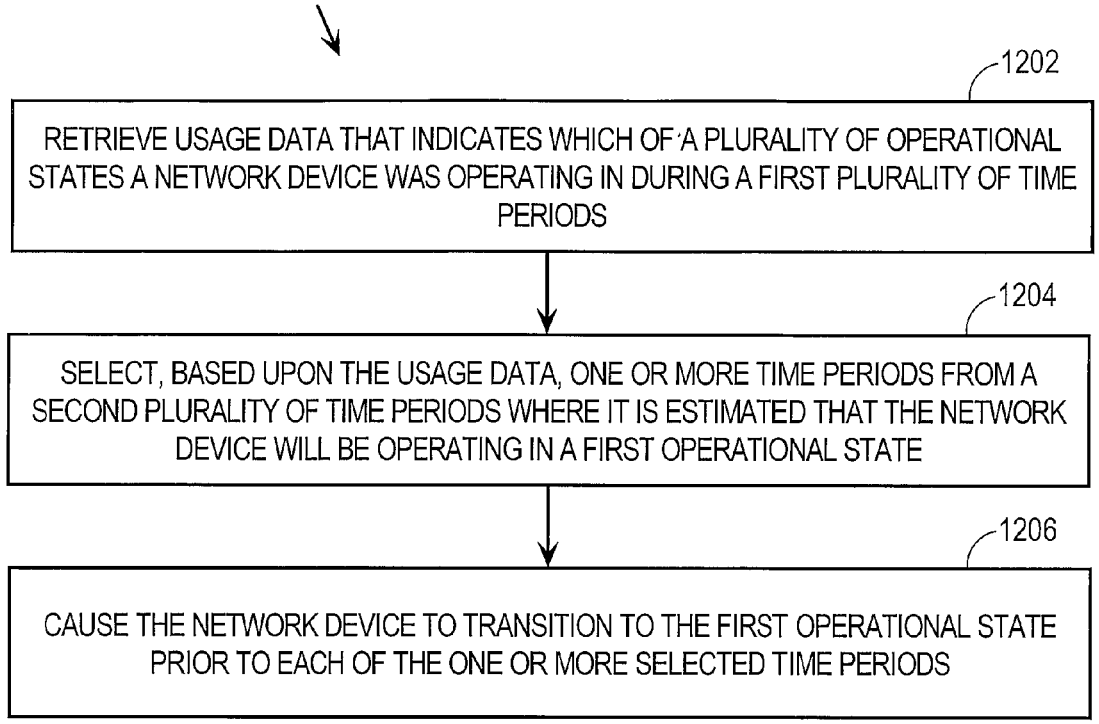
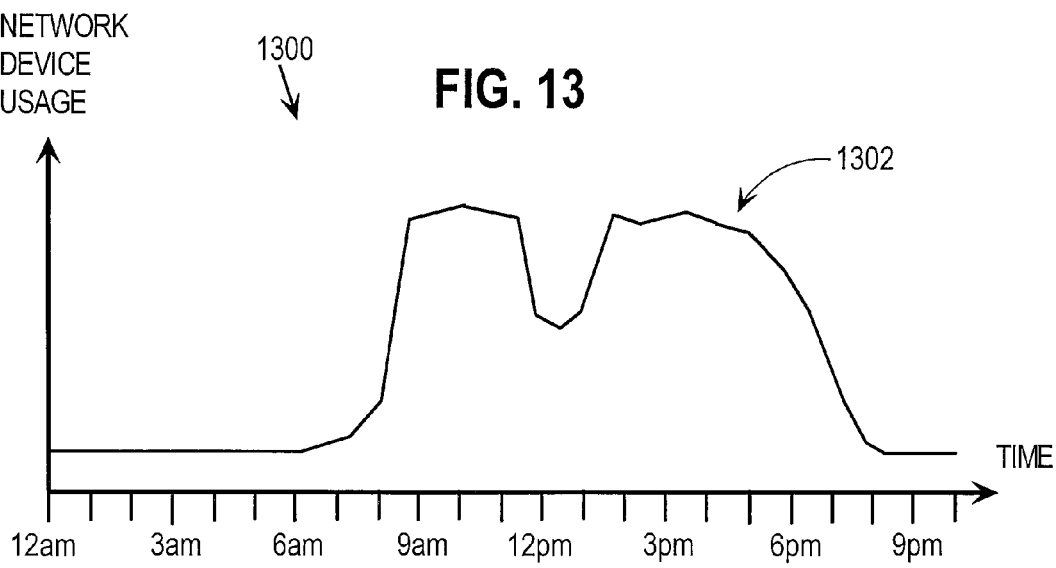

FIG. 14

USAGE DATA

1400

| Time | Mon | Tues | Wed | Thurs | Fri | Sat | Sun |
|---|---|---|---|---|---|---|---|
| 00:00 | 0 | 0 | 0 | 0 | 0 | 0 | 2 |
| 00:15 | 0 | 0 | 0 | 0 | 0 | 0 | 2 |
| 00:30 | 0 | 0 | 0 | 0 | 0 | 0 | 2 |
| ⋮ | ⋮ | ⋮ | ⋮ | ⋮ | ⋮ | ⋮ | ⋮ |
| 09:45 | 7 | 8 | 3 | 9 | 6 | 1 | 0 |
| 10:00 | 4 | 6 | 3 | 8 | 5 | 2 | 0 |
| ⋮ | ⋮ | ⋮ | ⋮ | ⋮ | ⋮ | ⋮ | ⋮ |
| 12:30 | 2 | 2 | 1 | 3 | 1 | 1 | 0 |
| 12:45 | 1 | 3 | 2 | 1 | 2 | 0 | 0 |
| ⋮ | ⋮ | ⋮ | ⋮ | ⋮ | ⋮ | ⋮ | ⋮ |
| 14:45 | 4 | 5 | 6 | 4 | 7 | 0 | 0 |
| 15:00 | 9 | 6 | 7 | 4 | 5 | 0 | 0 |
| ⋮ | ⋮ | ⋮ | ⋮ | ⋮ | ⋮ | ⋮ | ⋮ |
| 23:30 | 0 | 0 | 0 | 0 | 0 | 0 | 2 |
| 23:45 | 0 | 0 | 0 | 0 | 0 | 0 | 3 |

*n* WEEKS — 1402

LOCATION AND DEVICE CAPABILITIES DATA

| Device Name | Device Vendor | IP Address | Geographical Location | Device Capabilities |
|---|---|---|---|---|
| PD1 | ABC | 128.7.41.27 | Bldg. 1, Area 47 | MF; Duplex; B&W; 30ppm |
| PD2 | DEF | 128.7.43.39 | Bldg. 1, Area 47 | Printer; Duplex; B&W; 45ppm |
| PD3 | ABC | 128.7.41.56 | Bldg. 1, Area 47 | MF; Duplex; Color; Stapling; 35ppm |

COST DATA

| Device Name | Device Vendor | Supply Name | Supply Duty | Cost |
|---|---|---|---|---|
| PD1 | ABC | Toner Cartridge | 10,000 Pages | $75 |
| PD1 | ABC | Fuser | 50,000 Pages | $175 |
| PD1 | ABC | Roller | 25,000 Pages | $25 |
| PD1 | ABC | Energy | n/a | 300 w/hr active; 10 w/hr sleep |
| PD1 | ABC | Acquisition | 7 years | $7000 |

EXISTING PRINTING DEVICE ARRANGEMENT

| Device Name | Device Vendor | IP Address | Geographical Location | Cost | Device Capabilities |
|---|---|---|---|---|---|
| PD1 | ABC | 128.7.41.27 | Bldg. 1, Area 47 | $200 | MF; Duplex; B&W; 30ppm |
| PD2 | DEF | 128.7.43.39 | Bldg. 1, Area 47 | $240 | Printer; Duplex; B&W; 45ppm |
| PD3 | ABC | 128.7.41.56 | Bldg. 1, Area 47 | $310 | MF; Duplex; Color; Stapling; 35ppm |

Total Cost $750

CANDIDATE ALTERNATIVE PRINTING DEVICE ARRANGEMENT

| Device Name | Device Vendor | IP Address | Geographical Location | Cost | Device Capabilities |
|---|---|---|---|---|---|
| PD1 | ABC | 128.7.41.27 | Bldg. 1, Area 47 | $200 | MF; Duplex; B&W; 30ppm |
| PD4 | ABC | 128.8.31.36 | Bldg. 1, Area 47 | $340 | MF; Duplex; Color; Stapling; 50ppm |

Total Cost $540

CANDIDATE ALTERNATIVE PRINTING DEVICE ARRANGEMENT

| Device Name | Device Vendor | IP Address | Geographical Location | Cost | Device Capabilities |
|---|---|---|---|---|---|
| PD1 | ABC | 128.7.41.27 | Bldg. 1, Area 47 | $200 | MF; Duplex; B&W; 30ppm |
| PD5 | XYZ | 128.3.22.38 | Bldg. 1, Area 47 | $100 | Printer; Duplex; B&W; 40ppm |
| PD6 | XYZ | 128.1.46.21 | Bldg. 1, Area 47 | $100 | Printer; Duplex; B&W; 40ppm |
| PD7 | XYZ | 128.9.47.77 | Bldg. 1, Area 47 | $220 | MF; Duplex; Color; Stapling; 50ppm |

Total Cost $620

CANDIDATE ALTERNATIVE PRINTING DEVICE ARRANGEMENT

| Device Name | Device Vendor | IP Address | Geographical Location | Cost | Device Capabilities |
|---|---|---|---|---|---|
| PD8 | Ricoh | 128.7.41.27 | Bldg. 1, Area 47 | $180 | Printer; Duplex; B&W; 30ppm |
| PD9 | Ricoh | 128.8.31.36 | Bldg. 1, Area 47 | $190 | MF; Duplex; Color; Stapling; 50ppm |

Total Cost $370

CANDIDATE ALTERNATIVE PRINTING DEVICE ARRANGEMENT

| Device Name | Device Vendor | IP Address | Geographical Location | Cost | Device Capabilities |
|---|---|---|---|---|---|
| PD1 | ABC | 128.2.41.27 | Bldg. 1, Area 47 | $200 | MF; Duplex; B&W; 30ppm |
| PD10 | STA | 125.1.31.36 | Bldg. 1, Area 47 | $200 | MF: Duplex; Color; 50ppm |

Total Cost $400

APPROACH FOR DETERMINING ALTERNATIVE PRINTING DEVICE ARRANGEMENTS

RELATED APPLICATIONS

This patent application is related to U.S. patent application Ser. No. 11/809,376, filed on Jun. 1, 2007, now issued as U.S. Pat. No. 7,464,279, and entitled "Pre-Activation of Network Devices", which is a continuation of U.S. patent application Ser. No. 10/938,306, filed on Sep. 10, 2004, now issued as U.S. Pat. No. 7,249,269, and entitled "Method of Pre-Activating Network Devices Based Upon Previous Usage Data", the contents both of which are incorporated herein by reference in their entirety for all purposes.

This application is related to U.S. patent application Ser. No. 10/245,935, filed on Sep. 17, 2002, now issued as U.S. Pat. No. 6,748,299, and entitled "Approach for Managing Power Consumption in Buildings", the contents of which are incorporated herein by reference in their entirety for all purposes.

This application is also related to U.S. patent application Ser. No. 10/371,379, filed on Feb. 20, 2003, now issued as U.S. Pat. No. 6,766,223, and entitled "Approach for Managing Power Consumption of Network Devices" the contents of which are incorporated herein by reference in their entirety for all purposes.

FIELD OF THE INVENTION

The invention relates to networked devices generally, and more specifically, to an approach for determining alternative printing device arrangements.

BACKGROUND OF THE INVENTION

Reducing power consumption has become an important issue for businesses because of environmental concerns and the rising costs of electricity. In addition to managing electricity consumption attributable to lighting and heating and air cooling systems, corporations have to manage increased electricity usage attributable to communications networks and computer systems. This includes, for example, local area networks (LANs), and all of the network devices connected thereto, such as personal computers and shared network devices, such as copiers, printers, scanners and facsimile machines.

Corporations have made significant progress in reducing power consumption through employee education programs that encourage employees to turn off their lights and personal computers when they leave work each day. The success of this approach depends upon the diligence of employees in turning off lights, computers and other equipment when not in use. Some types of equipment take a long time to power up from a powered down state. For example, it is not uncommon for personal computers to require several minutes to "boot up." Other types of equipment, such as copy machines and laboratory instruments, can require even more time to complete a power up cycle. These delays can have an adverse effect on productivity in situations where large numbers of employees are waiting for equipment to power up. As a result of these long delays, many employees leave equipment on all the time.

Another approach has been to configure certain types of equipment, such as personal computers and shared network devices, with a power saving mode of operation. A power saving mode is an operating mode in which a device consumes less power, typically by shutting down one or more subsystems or services. For example, when configured with a power saving mode, personal computers typically shut down the hard disk and monitor after a specified amount of time has passed without any keyboard or mouse activity. When keyboard or mouse activity resumes, power is restored to all components and the personal computer returns to the regular power state. Other types of shared network devices may also be configured with power saving modes of operation. For example, a copier or printer may be configured to shut down certain mechanical functions, such as a fuser module, but maintain power to an electronics module that contains the controller. A copier or printer may enter a power saving mode after no request to copy or print a document has been received for a specified amount of time. When the copier or printer receives a request to copy or print a document, then power is restored to the mechanical functions so that the copying and printing functions may be performed. The use of power saving modes of operation in personal computers and other shared network devices can save a significant amount of power.

In addition to saving costs attributable to energy consumption, it is also desirable to reduce operational costs and acquisition costs for printing device arrangements. Newer printing devices often provide greater functionality with lower operating costs, lower power consumption and lower acquisition costs, but it can be difficult to evaluate alternative printing device configurations.

SUMMARY

According to one embodiment of the invention, an approach is provided for determining alternative printing device arrangements. In general, the geographic locations, usage and costs of an existing set of printing devices are analyzed. A determination is made, based upon this analysis, whether one or more of the existing printing devices can be replaced by one or more replacement printing devices to provide an alternative printing device arrangement that has lower costs. The lower costs may reflect lower operational costs, lower energy costs, lower acquisition costs, or any combination of lower operational costs, lower energy costs and lower acquisition costs.

According to one aspect of the invention, a computer-implemented method is provided for determining an alternative printing device arrangement. According to the computer-implemented method, first printing device attribute data is retrieved that indicates at least geographic locations of one or more printing devices in an existing printing device arrangement. First printing device cost data is retrieved that indicates at least costs of printing on the one or more printing devices in the existing printing device arrangement. Printing device usage data is also retrieved that indicates usage of the one or more printing devices in the existing printing device arrangement during a first specified time and one or more options for the one or more printing devices in the existing printing device arrangement used during the first specified time. Actual costs for operating the one or more printing devices in the existing printing device arrangement during the first specified time are determined based upon the printing device usage data and the printing device cost data. Second printing device attribute data is retrieved that indicates at least one or more options supported by one or more replacement printing devices. Second printing device cost data is retrieved that indicates at least costs of printing on the one or more replacement printing devices. The alternative printing device arrangement is determined based upon the geographic locations of the one or more printing devices, the printing device usage data, the actual costs for operating the one or more printing devices during the first specified time, the second printing device attribute data and the second printing device cost data. The alternative printing device arrangement has lower actual costs than the existing printing device arrangement during the first specified time and includes one or more of the one or more replacement printing devices.

BRIEF DESCRIPTION OF THE DRAWINGS

Embodiments are illustrated by way of example, and not by way of limitation, in the figures of the accompanying drawings in which like reference numerals refer to similar elements and in which:

FIGS. 7A and 7B are block diagrams that depict example data tables according to another embodiment of the invention;

FIG. 12 is a block diagram that depicts an approach for managing a network device according to an embodiment of the invention;

FIG. 13 includes a graph that visually depicts the usage of a network device over time and more specifically, the usage of the network device over a 24 hour period;

FIG. 14 depicts a table of example usage data collected for a printing device over a seven-day, 24 hour per day, period.

FIG. 17 depicts a table that stores example location data and device capabilities data for printing devices.

FIG. 18 depicts a table that stores example cost data for a printing device.

FIG. 19 depicts a table that stores information for an existing printing device arrangement.

FIGS. 20A-20D depict tables that store information for candidate alternative printing device arrangements.

DETAILED DESCRIPTION

Figure 1:
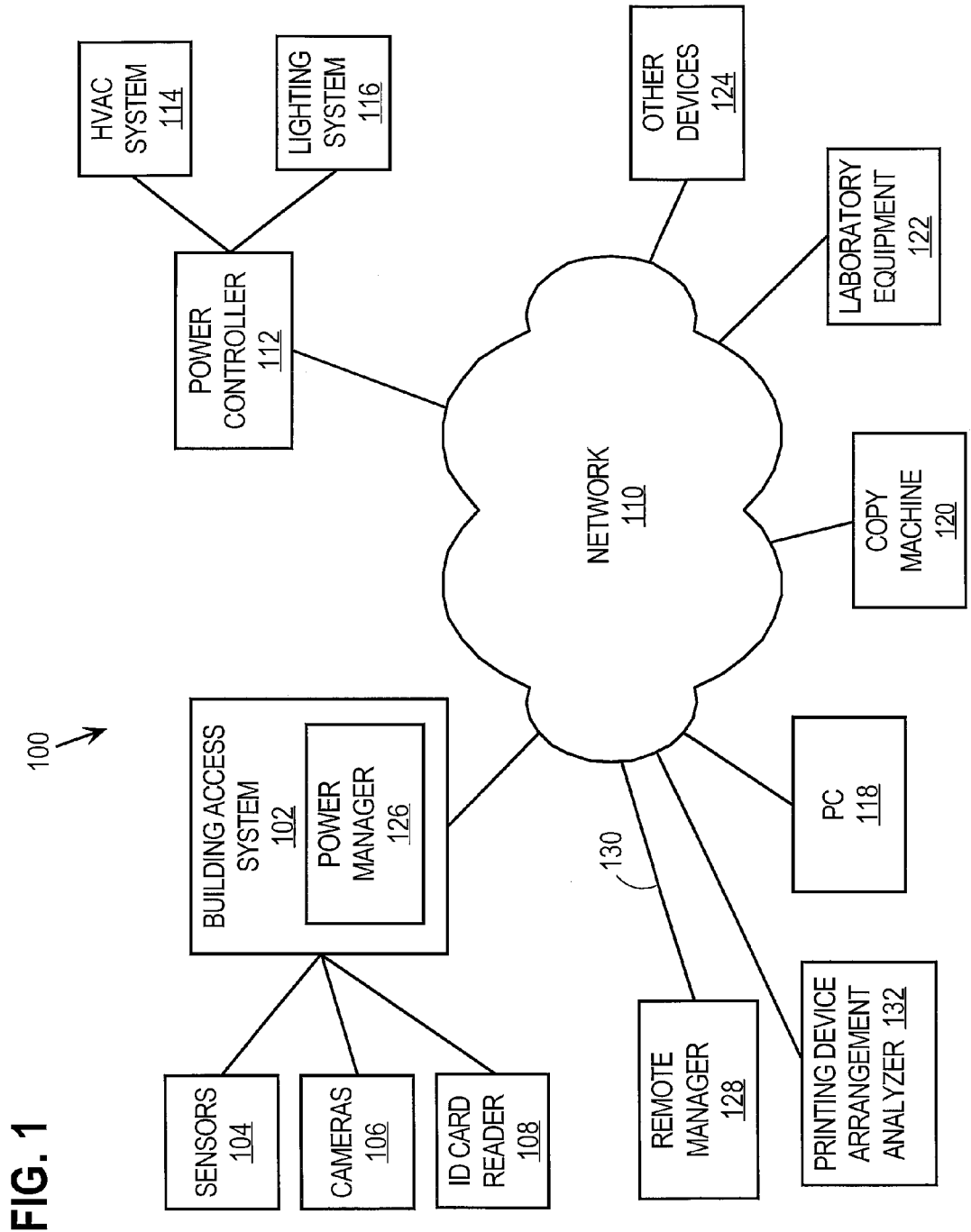
FIG. 1 is a block diagram that depicts an arrangement for managing power consumption in a building according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Various embodiments and aspects of the invention are described hereinafter in the following sections:

I. OVERVIEW
II. POWER MANAGEMENT ARCHITECTURE
III. MANAGING POWER DURING BUILDING ENTRY AND EXIT
IV. IMPLEMENTATION MECHANISMS
V. REMOTE MANAGEMENT APPLICATIONS
VI. OPERATIONAL STATE HIERARCHIES
VII. EXAMPLE MULTI-FUNCTION PERIPHERAL (MFP) ARCHITECTURE
VIII. NETWORK DEVICE PRE-ACTIVATION
   A. Usage Data
   B. Collecting and Storing Usage Data
   C. Using Usage Data to Estimate Future Usage of a Network Device
   D. Updates to Usage Data
   E. Using Pre-Activation With Building Access Detection
IX. APPROACH FOR DETERMINING ALTERNATIVE PRINTING DEVICE ARRANGEMENTS I. Overview An approach for managing power consumption of network devices includes determining whether one or more state change criteria for a network device are satisfied. The state change criteria may include a variety of criteria, depending upon the requirements of a particular implementation and the invention is not limited to any particular state change criteria. Examples of state change criteria include, without limitation, whether the network device needs to be operating in a different operational state to perform a specified function and whether a specified function has been completed.

If the one or more state change criteria for the network device are satisfied, then the network device is signaled over a communications network to cause the network device to change operational states. According to one embodiment of the invention, the signaling causes the network device to change from a first operational state in a plurality of operational states to a second operational state in the plurality of operational states. The network device consumes a different amount of power when operating in the second operational state relative to when the network device is operating in the first operational state.

For example, suppose that when operating in the first operational state, the network device is operating in a "sleep" state. In the sleep state, power is supplied to a controller, but not to a mechanical module, such as a printer module in the network device. Suppose further that the state change criteria includes whether the network device needs to be operating in a different operational state to perform a specified function. In the present example, assume that a printer module in the network device is now, or soon will be, required to print an electronic document. This may occur, for example, because it is known that a particular electronic document needs to be printed, or because a user of the network device has entered a building and it is likely that the user will soon need to use the printing capabilities provided by the printer module of the network device.

Since the state change criteria has been satisfied, the current operational state of the network device is changed from the sleep mode to a second operational state where power is supplied to the printer module so that the functionality of the printer module is available. The network device consumes more power in the second operational state relative to the first (sleep) operational state since, when the network device is operating in the second operational state, power is applied to the printer module.

As another example, suppose that the network device is currently operating in the aforementioned second operational state. Suppose further that the state change criteria includes whether the specified function has been completed. Once the electronic document has been printed, the printer module is no longer needed and the state change criteria are again satisfied. In this situation, however, the current operational state of the network device is changed from the second operational state where power is supplied to the printer module back to the sleep mode so that the amount of power consumed by the network device is reduced.

According to another embodiment of the invention, an approach for managing power consumption of resources includes receiving a signal that indicates that a user has entered or left the building. In response to receiving the signal, one or more resources in the building are transitioned between a first state and a second state. When operating in the first state, the one or more resources consume relatively less power relative to when the one or more resources are operating in the second state. The approach is applicable to all types of resources, including private resources that are used primarily by the user, and shared resources that are used by the user and other users. Example resources include, without limitation, computers, laboratory equipment and instruments, copy machines, facsimile machines, printers, postage machines, lights and heating and air conditioning systems.

According to one embodiment of the invention, a determination is made, based upon the signal and status data, whether the user has entered the building or left the building. If the user has entered the building, then the one or more resources are transitioned from the first state to the second state. If the user has left the building, then the one or more resources are transitioned from the second state to the first state.

According to another embodiment of the invention, a determination is made, based upon the signal and status data, whether the user was either the first user to enter the building or the last user to leave the building. If the user was the first user to enter the building, then one or more shared resources are transitioned from the first state to the second state. If the user was the last user to leave the building, then the one or more shared resources are transitioned from the second state to the first state.

II. Power Management Architecture

FIG. 1 is a block diagram that depicts an arrangement for managing power consumption of network devices, in the context of resources within a building, according to an embodiment of the invention. Arrangement 100 includes a building access system 102 communicatively coupled to sensors 104, cameras 106 and an ID card reader 108.

Building access system 102 monitors and tracks individuals who enter and leave the building based upon data from sensors 104, cameras 106 and ID card reader 108. For example, access to the building may be restricted to individuals who have a valid ID card. To enter the building, an individual must first have their ID card read by ID card reader 108. ID card reader 108 provides identification data from the ID card to building access system 102 that verifies the identification data stored at the ID card against valid identification data maintained by building access system 102. If the identification data matches valid identification data maintained by building access system 102, then access to the building is granted, e.g., by unlocking a door. If the identification data does not match valid identification data maintained by building access system 102, then access to the building is denied. Building access system 102 may also maintain data that indicates dates and time of successful and unsuccessful accesses, e.g., on a non-volatile storage.

Building access system 102 is coupled to a network 110 for communicating with other elements as described hereinafter. Network 110 may be any type of medium or mechanism that provides for the exchange of data between the connected elements. Example networks include, without limitation, Local Area Networks (LANs), Wide Area Networks (WANs), the Internet, and combinations thereof, and the invention is not limited to any particular type of network or network arrangement.

Arrangement 100 also includes a power controller 112 that is communicatively coupled to and manages power for a heating ventilation air conditioning (HVAC) system 114 and a lighting system 116. Arrangement 100 further includes a personal computer (PC) 118, a copy machine 120, laboratory equipment 122 and other devices 124 that are each communicatively coupled to network 110. Arrangement 100 also includes a power manager 126 configured to manage power consumption in the building, in accordance with an embodiment of the invention. Arrangement further includes a remote manager 128 communicatively coupled to network 110 via a communications link 130 and a printing device arrangement analyzer 132. Remote manager 128 manages power consumed by network devices, such as PC 118, copy machine 120, laboratory equipment 122 and other devices 124. Printing device arrangement analyzer 132 analyzes the costs of printing device arrangements and determines alternative printing device arrangements with lower costs.

III. Managing Power During Building Entry and Exit

Figure 2A:
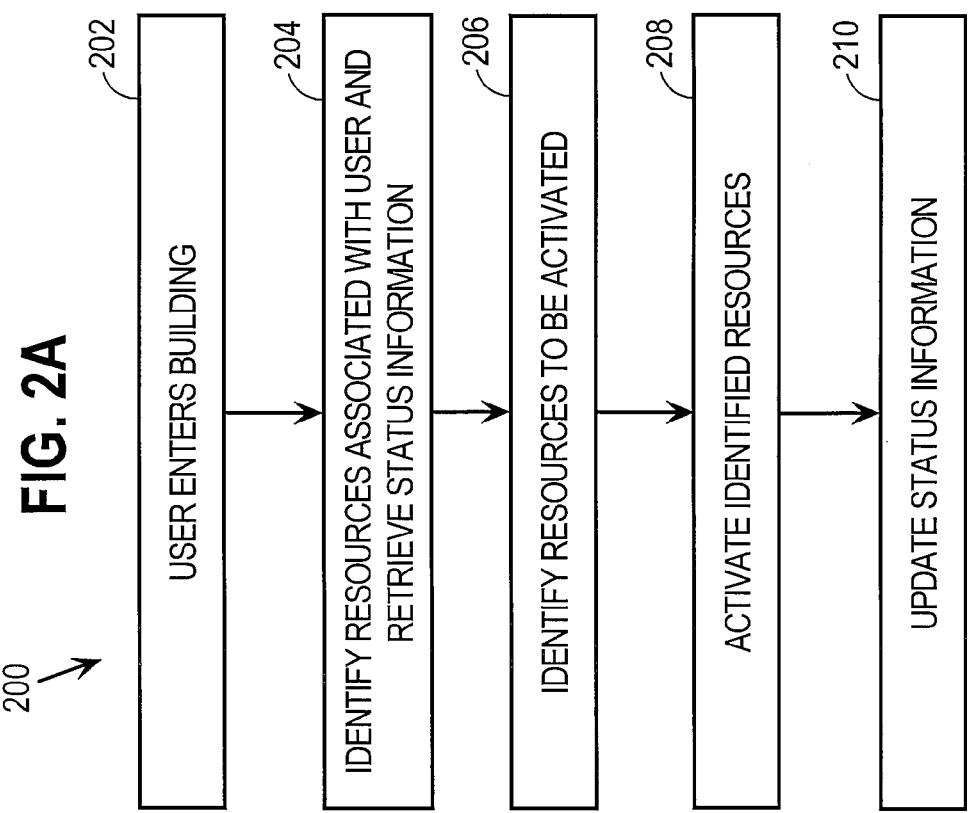
FIG. 2A is a block diagram that depicts an approach for managing power during building entry according to an embodiment of the invention.

FIG. 2A is a flow diagram 200 that depicts an approach for managing power consumption of network devices, in the context of resources within a building, according to an embodiment of the invention. In step 202, a user makes a successful entry into the building. As previously described herein, a successful entry is made when the user is identified as having the authority to enter the building. For example, the user has an identification card scanned by ID card reader 108 and verified by building access system 102.

In step 204, power manager 126 identifies private and shared resources associated with the user and retrieves status information for the identified resources. The status information indicates the current status of the identified resources, namely, whether the resources are on or off Power manager 126 also identifies the other users associated with the same resources. Power manager 126 may maintain data that specifies associations between users and resources to enable power manager 126 to quickly determine which resources are associated with particular users. Power manager 126 may also maintain status data that indicates the current status of resources. Both types of data may be maintained by power manager 126 in local non-volatile storage, such as one or more disks, or remotely, e.g., in a remote database, as described in more detail hereinafter.

In step 206, power manager 126 identifies which of the private and shared resources are to be activated. In general, these are the resources that the user will need. Thus, power manager 126 identifies resources that are associated with the user that are currently off. For example, power manager 126 may determine that private resources, such as the user's PC and office lights are currently off and will be needed by the user. As another example, power manager 126 may determine that shared resources, such as hallway lights, copy machines, laboratory equipment, or other devices, are currently off and will be needed by the user.

Figures 2B, 2C:
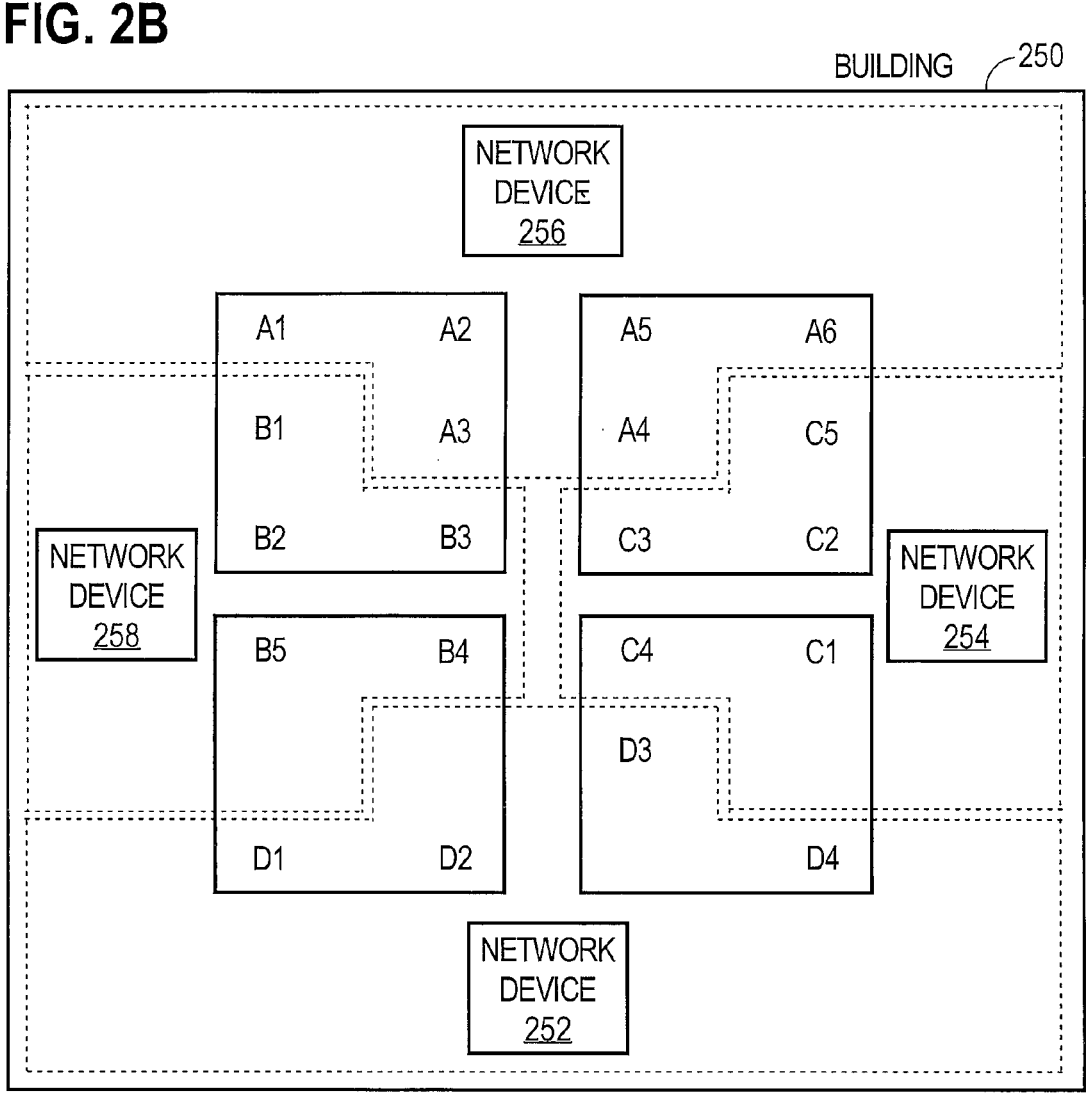
FIG. 2B is a block diagram that depicts a building having network devices and users.
FIG. 2C is a table that depicts relationships between shared network devices and users.

For example, FIG. 2B is a block diagram that depicts a building 250 having network devices 252, 254, 256, 258 and users A1-A6, B1-B5, C1-C5 and D1-D4. As depicted by FIG. 2B and a table 270 of FIG. 2C, users A1-A6 are logically associated with network device 256, users B1-B5 are logically associated with network device 258, users C1C5 are logically associated with network device 254 and users D1-D4 are logically associated with network device 252. The aforementioned logical associations may be based upon physical associations. For example, as depicted in FIG. 2B, users A1-A6 are physically located closer to network device 256 than network devices 252, 254 and 258. Thus, users A1-A6 are configured to use network device 256. For example, in the context where network devices 252-258 are shared devices such as printers, personal computers associated with users A1-A6 are configured to print to network device 256, rather than network devices 252, 254 and 258. Similarly, the personal computers associated with users B1-B5 are configured to print to network device 258, the personal computers associated with users C1C5 are configured to print to network device 254 and the personal computers associated with users D1-D4 are configured to print to network device 252.

Suppose that user A1 has entered building 250. In step 206, power manager 126 consults table 270 of FIG. 2C and determines that network device 256 is logically associated with user A1 and is currently off, or in a sleep mode. Thus, the operational state of network device 256 needs to be changed to an operational state that will allow user A1 to use network device 256.

In step 208, power manager 126 activates the resources. The particular actions taken to activate a resource may vary depending upon the type and attributes of the resource to be activated. For example, for some resources, such as copy machine 120, power manager 126 sends a signal to activate copy machine 120. The signal may cause copy machine 120 to transition from an off or "sleep" state to an active state. Alternatively, power manager 126 may signal another entity, such as power controller 112, to apply power to copy machine 120.

As another example, to activate the user's PC 118, power manager 126 may send a signal to a network interface card (NIC) in PC 118 to cause PC 118 to transition from an off or "sleep" state to an active state. As yet another example, power manager 126 may send a signal to power controller 112 requesting that HVAC system 114 and lighting system 116 be activated to provide HVAC services and lighting to the physical area where the user will need those services.

In step 210, the status information is updated to reflect any changes that were made. For example, according to one embodiment of the invention, power manager 126 updates the status information stored on non-volatile storage to reflect the resources that were activated and that the user is now inside the building.

According to this approach, resources required by the user are activated when the user enters the building. This is particularly helpful in situations where resources require several minutes to be activated because the resources will be at least partially activated, and ideally fully activated, by the time the user reaches their working area.

Figure 3:
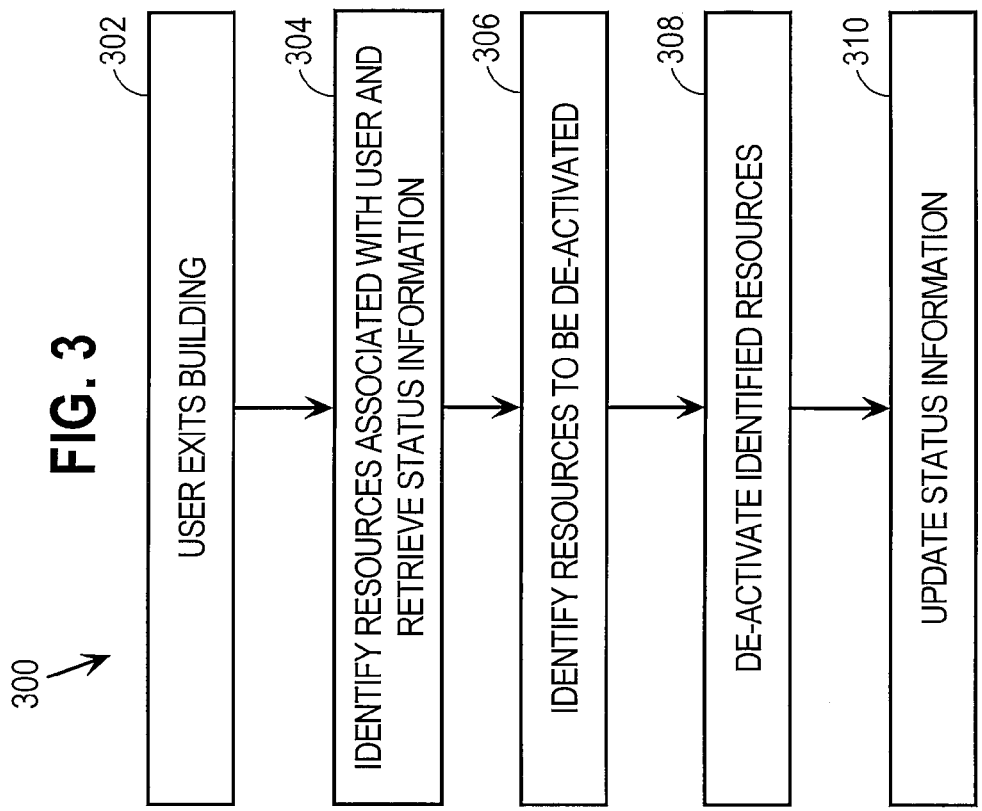
FIG. 3 is a block diagram that depicts an approach for managing power during building exit according to an embodiment of the invention.

FIG. 3 is a flow diagram 300 that depicts an approach for managing power during building exit according to an embodiment of the invention. In step 302, a user exits the building and building access system 102 is aware that the user has exited the building.

In step 304, power manager 126 identifies private and shared resources associated with the user and retrieves status information for the identified resources. The status information indicates the current status of the identified resources, namely, whether the resources are currently on or off. Power manager 126 also identifies the other users associated with the same resources.

In step 306, power manager 126 identifies which of the private and shared resources are to be de-activated. In general, these are the resources that the user will no longer need to use. Thus, power manager 126 identifies private resources that are associated with the user that are currently on and should be turned off. For example, power manager 126 may determine that the user's PC and office lights (private resources) are currently on. For shared resources, power manager 126 examines the status information to identify shared resources that are both associated with the user and no longer needed by the user or any other users. For example, power manager 126 may determine that hallway lights, a copy machine, laboratory equipment, or other devices (shared resources) are currently on and that the user is the last user in the building associated with these shared resources. These resources are identified for de-activation. Shared resources that are associated with both the user and at least one other user that is still in the building are not selected for de-activation.

In step 308, power manager 126 de-activates the identified resources. The steps required to de-activate a particular resource may vary from resource to resource. For example, to de-activate HVAC system 114 and lighting system 116, power manager 126 sends a signal to power controller 112 requesting that power controller 112 de-activate HVAC system 114 and lighting system 116. For other devices, such as PC 118 or copy machine 120, currently-executing processes are permitted to finish processing before the devices are de-activated. For example, to de-activate copy machine 120, power manager 126 sends a command to copy machine 120. Copy machine 120 finishes processing any current copy jobs and then enters the off or "sleep" state.

As another example, power manager 126 may send a de-activate or "sleep" command to PC 118, e.g., to a network interface card (NIC) in PC 118, which queues the command until processes that are currently executing are completed. Once those processes have completed their processing, the NIC causes PC 118 to enter an off or "sleep" state. These steps may be performed, for example, by an application executing on PC 118 or by an operating system function. Alternatively, if power manager 126 is aware of the processes executing on PC 118, then power manager 126 may cause the termination of those processes remotely and then issue the off or "sleep" command to PC 118. The processes may be closed simultaneously or one by one, depending upon the type of PC 118 and processes.

Figure 4:
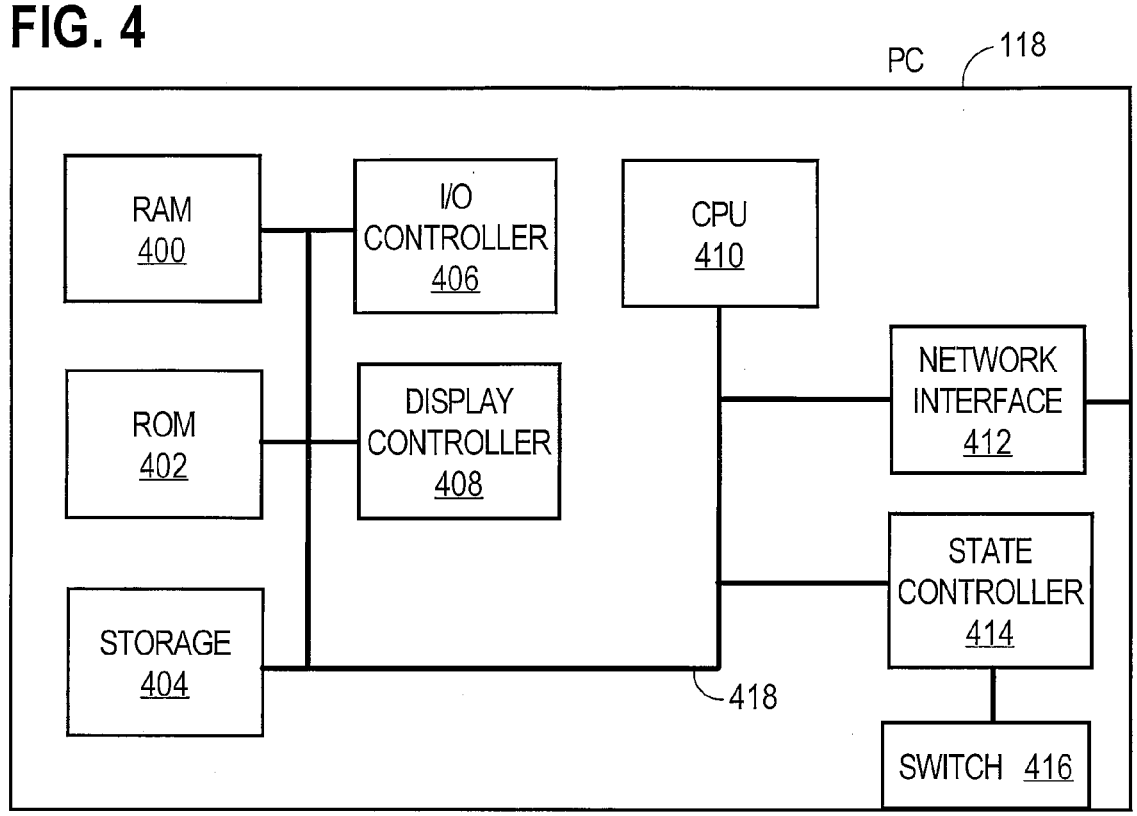
FIG. 4 is a block diagram that depicts an example implementation of a personal computer configured in accordance with an embodiment of the invention.

FIG. 4 is a block diagram that depicts an example implementation of PC 118. In this example, PC 118 includes a random access memory (RAM) 400, a read-only memory (ROM) 402 and storage 404, such as one or more disks, optical disks, flash memories, tape drives, or a combination thereof. PC 118 also includes an input/output (I/O) controller 406, a display controller 408, a central processing unit (CPU) 410, a network interface 412, a state controller 414 and a switch 416. All of these components, except for switch 416, are communicatively coupled to each other via a bus 418. Switch 416 is manually accessible and allows a user to manually change the state of PC 118, e.g., between off and on states.

In operation, network interface 412 is configured to receive external signals, e.g., state change signals from power manager 126, and provide those signals to state controller 414 via bus 418. State controller 414 controls the state of PC 118. For example, power manager 126 issues a "sleep" command to PC 118 that is received by network interface 412. Network interface 412 provides the "sleep" command to state controller 414, which causes PC 118 to enter the "sleep" state. In the "sleep" state, PC 118 consumes relatively less power than when operating in the active or fully "on" state. As described herein, one or more processes that are executing at the time the "sleep" command is received by PC 118 are shut down before PC 118 is put into the "sleep" state.

In step 310, the status information is updated to reflect any changes that were made. For example, according to one embodiment of the invention, power manager 126 updates the status information stored on non-volatile storage to reflect the resources that were de-activated and that the user is now outside the building.

According to this approach, private resources required by the user are de-activated when the user exits the building. Also, shared resources that are no longer required by the user or any other users are also de-activated. This provides a significant reduction in the amount of power consumed by the private and shared resources, since they are de-activated when the users that require those resources exit the building.

IV. Implementation Mechanisms

Figure 5:
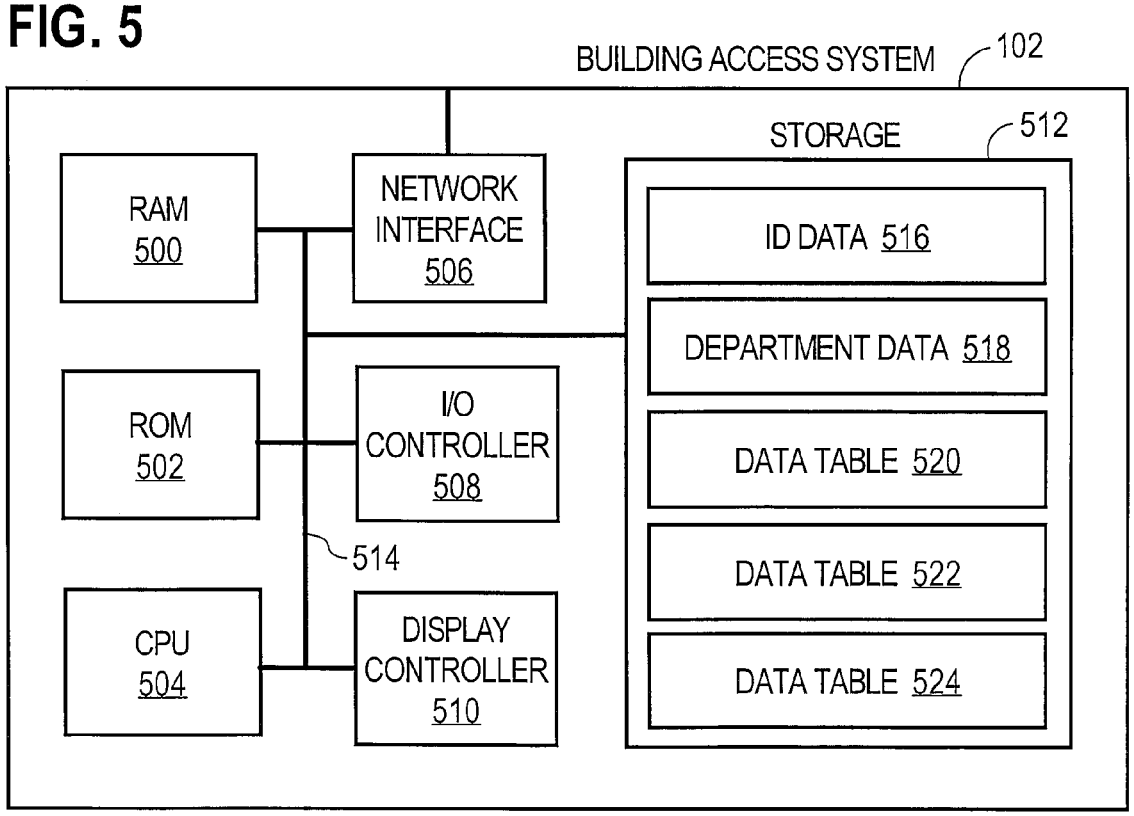
FIG. 5 is a block diagram that depicts an example implementation of building access system, in accordance with an embodiment of the invention.

FIG. 5 is a block diagram that depicts an example implementation of building access system 102. In this example, building access system 102 includes a RAM 500, a ROM 502, a CPU 504, a network interface 506, an I/O controller 508, a display controller 510 and storage 512 that are communicatively coupled to each other via a bus 514. In this example, power manager 126 and the building access functions are implemented as processes executed by CPU 504. The instructions executed by CPU 504 to perform these functions may be stored in RAM 500, ROM 502, storage 512, or any combination thereof.

Storage 512 may be implemented by any type of storage mechanism, such as one or more hard disks, optical disks, flash memories, tape drives, or a combination thereof, and the invention is not limited to any particular implementation. In the present example, storage 512 includes ID data 516, department data 518 and data tables 520, 522, 524. ID data 516 includes user identification data that specifies valid user IDs that may be used by building access system 102 to determine whether to allow users to access to the building. The user IDs are also used by power manager 126 as described herein to manage power consumption. Department data 518 is data that specifies a logical group within a building or organization, i.e., a department of a corporation, and the users that are members of the logical group.

Figure 6A:
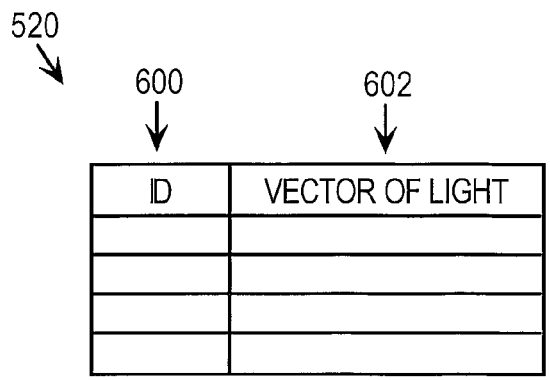
FIGS. 6A-6C are block diagrams that depict example implementations of data tables according to an embodiment of the invention.
Figure 6B:
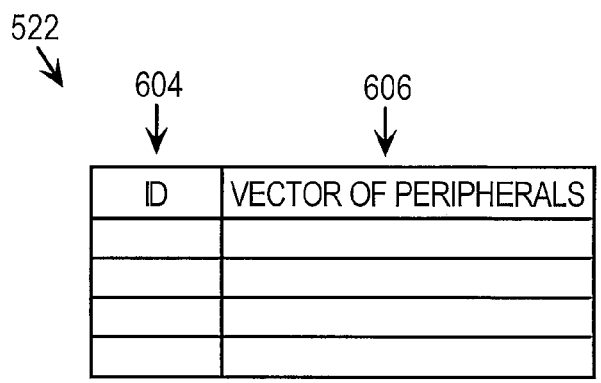
Figure 6C:
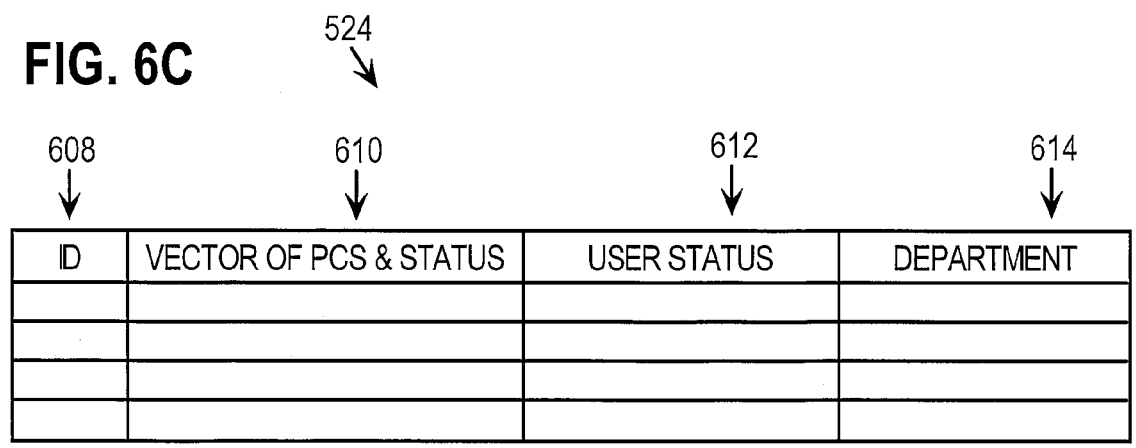

Data tables 520, 522, 524 contain data that is used to manage power consumption of network devices and resources as described herein. FIGS. 6A-6C are block diagrams that depict example implementations of data tables 520, 522, 524, according to an embodiment of the invention. In FIG. 6A, data table 520 is implemented as a table with a column 600 that contains user IDs and a column 602 that specifies private resources, in this example a vector of lights, associated with each user ID. In FIG. 6B, data table 522 is implemented as a table with a column 604 that contains user IDs and a column 606 that specifies private resources, in this example a vector of peripherals, associated with each user ID. In FIG. 6C, data table 524 is implemented as a table with a column 608 that contains user IDs, a column 610 that specifies a vector of PCs and status for each user ID in Column 606, a user status column 612 that specifies whether the user is in or out of the building and a department column 614 that specifies a logical group, in this example a department, with which the user is associated.

FIGS. 7A and 7B are block diagrams that depict example data tables 700, 708 that may be maintained on storage 512 according to an embodiment of the invention. In this example, data tables 700, 708 contain shared resource information used by power manager 126 to manage power in the building. For example, data table 700 includes a department column 702 that specifies a particular department, a vector of lights column 704 that stores a vector of lights associated with each department in column 702 and a vector of IDs column 706 that stores a vector of user IDs associated with each department in column 702. As another example, in FIG. 7B, data table 708 includes a department column 710 that specifies a particular department, a vector of peripherals column 712 that stores a vector of peripherals associated with each department in column 710, and a vector of IDs column 714 that stores a vector of user IDs associated with each department in column 710.

Although FIGS. 6A-6C, 7A and 7B depict specific examples of data maintained on storage 512, the invention is not limited to these particular examples, and any type of data may be stored depending upon the requirements of a particular application.

Figure 8:
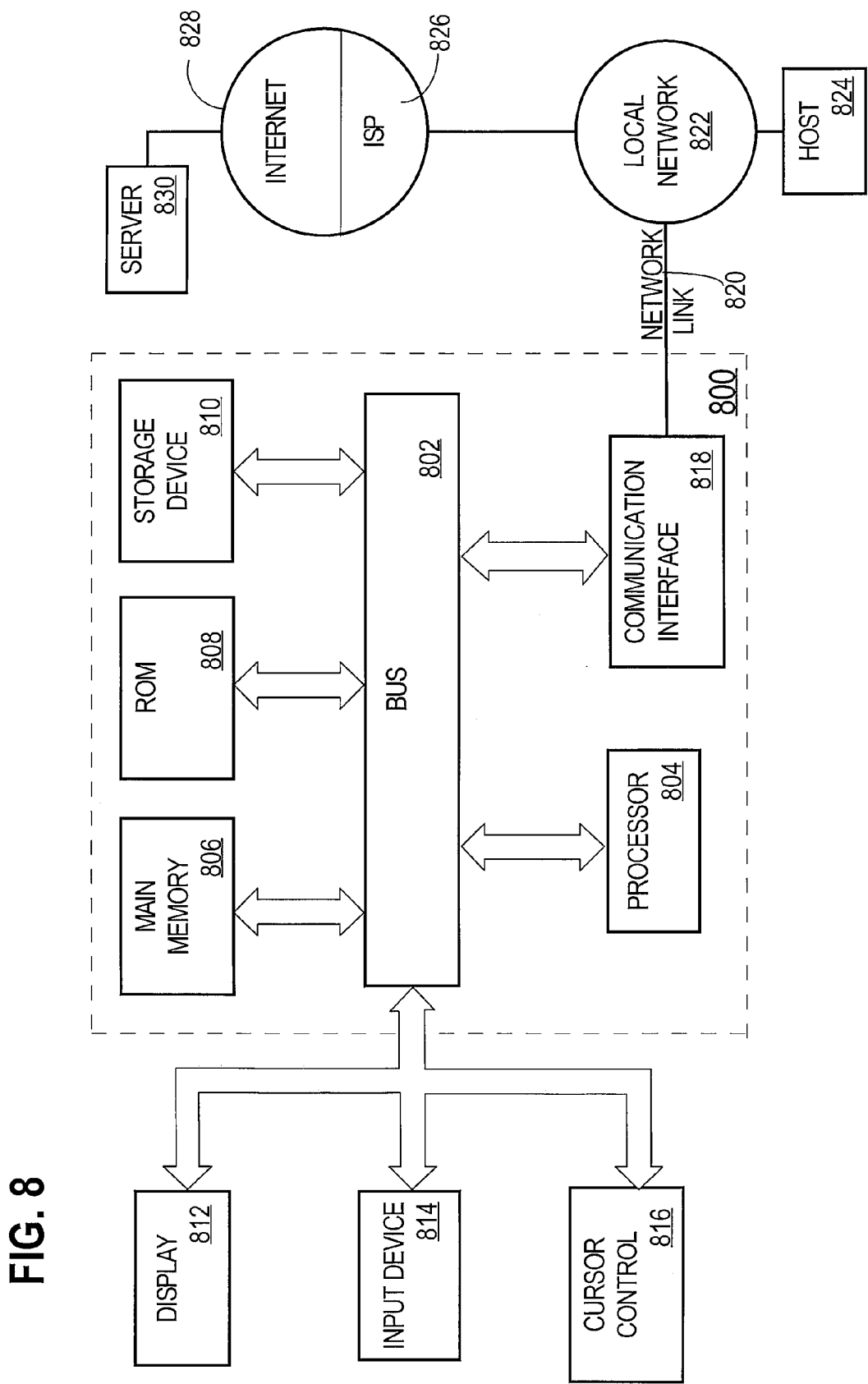
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for managing power consumption of network devices and resources. According to one embodiment of the invention, the management of power consumption of network devices and resources is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for the management of power consumption of network devices and resources as described herein. The received code may be executed by processor 804 as it is received, and/or stored in storage device 810, or other non-volatile storage for later execution.

Although embodiments of the system have been described herein in the context of managing power consumption in buildings, the approach is not limited to office buildings and is applicable to any type of structure or arrangement. For example, the approach is applicable to managing power consumption in office buildings, apartment buildings and homes. Also, although embodiments of the system have been described herein in the context of managing power consumption in buildings upon entry and exit to a building, the approach is also applicable to entry and exit to different portions of a building or complex. For example, the approach is applicable to situations where a user has entered a portion of a building or complex that the user was not in, or left a portion of a building or complex for at least a specified period of time. This may be implemented, for example, in situations where a user is required to present for verification an ID card to move between the different portions of the building or complex, e.g., via internal doors, hallways, causeways, etc., so that the movement can be detected and tracked. The approach is also applicable to situations where user identification is checked at a location external to a building, for example at a guard house or surrounding gate.

Power manager 126 may be implemented in hardware, computer software, or a combination of hardware and computer software and the invention is not limited to any particular implementation. Furthermore, although embodiments of the invention have been described in the context of power manager 126 being implemented as part of building access system 102, the invention is not limited to this implementation. The approach may be implemented in any of the other components in arrangement 100. Alternatively, the approach may be implemented as a stand-alone mechanism that interacts with the various components of arrangement 100.

The approach described herein for managing power consumption of network device and resources reduces the amount of power consumed by resources, while reducing the amount of time that users have to wait for resources to power up when they enter a building.

V. Remote Management Applications

The approach described herein for managing power consumption of network devices and resources is applicable to remote management applications where a power manager mechanism is located remotely with respect to one or more network devices. In this situation, the remote power manager manages the operational states of network devices over one or more communications networks. For example, the remote power manager may perform remote data collection, remote maintenance and remote diagnostics. The power requirements may be different for all three cases. For example, performing remote diagnostics may require a fully functioning mechanical system in a network device, while remote data collection may only require the reporting of electronically stored data. Also, such remote access may be performed during the night when the power levels of the network devices may not be known to the remote power manager.

For example, referring to FIG. 1, a remote manager 128 is communicatively coupled to network 110 via a communications link 130 that may be any type of communications link and include one or more networks. In accordance with an embodiment of the invention, remote manager 128 is configured to manage power consumed by network devices, such as PC 118, copy machine 120, laboratory equipment 122 and other devices 124. Remote manager 128 determines whether one or more state change criteria for a particular network device are satisfied. If the one or more state change criteria for the particular network device are satisfied, then remote manager 128 signals the particular network device over communications link 130 and network 110 to cause the particular network device to change from a first operational state in a plurality of operational states to a second operational state in the plurality of operational states. The network device consumes a different amount of power when operating in the second operational state relative to when the network device is operating in the first operational state. When a determination is made that the particular network device no longer needs to operate in the second operational state, then remote manager 128 signals the particular network device to cause the particular network device to transition back to the first operational state.

VI. Operational State Hierarchies

The approach described herein for managing power consumption of network devices and resources is applicable to network devices and resources having any number of operational modes. Some network devices are configured with two or more operation modes to provide finer granularity of operation.

Figure 9:
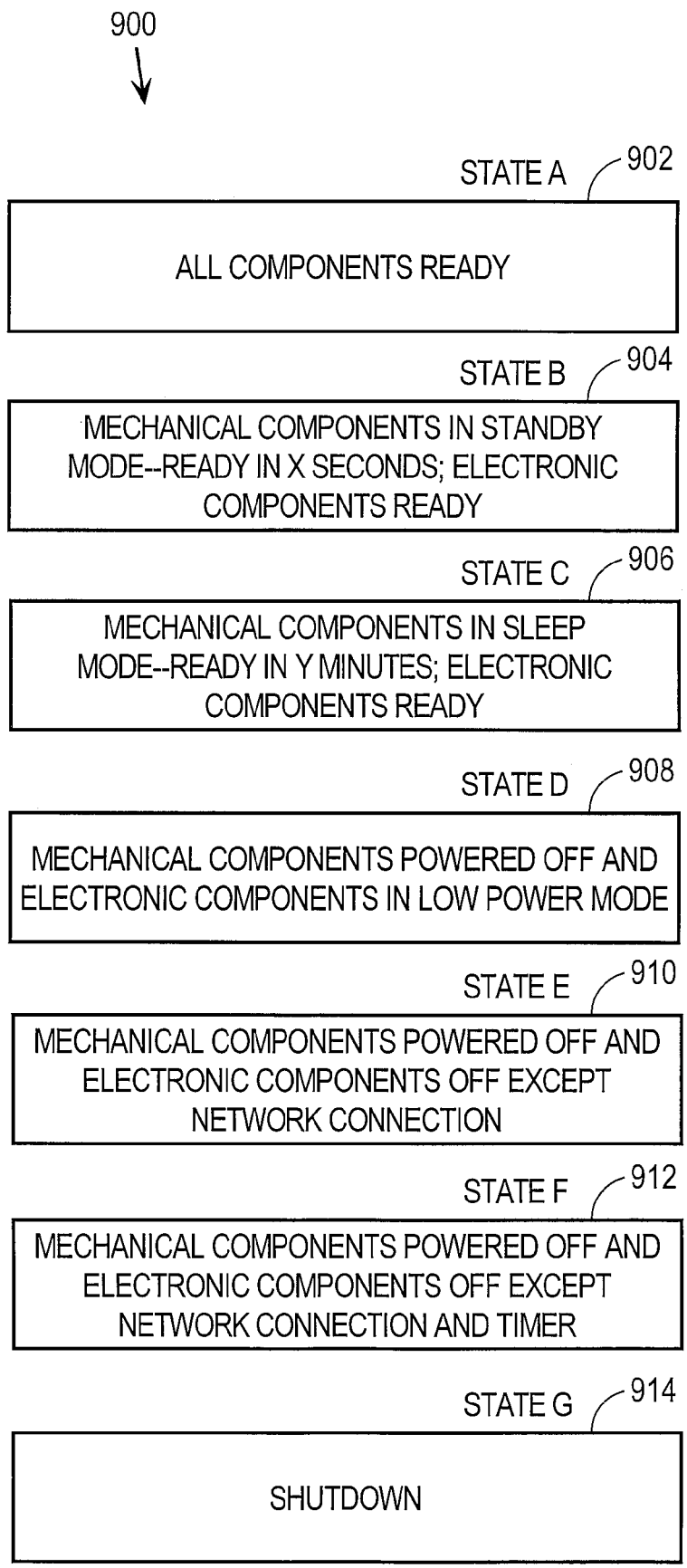
FIG. 9 is a block diagram that depicts a operational mode hierarchy for a network device, according to an embodiment of the invention.

FIG. 9 is a block diagram that depicts an operational mode hierarchy 900 for a network device. Hierarchy 900 includes states 902-914, labeled State A-State G, respectively, that represent an operational continuum over which the network device operates. The network device consumes the most power when operating in State A, 902 and relatively little or no power when in State G, 914. Specifically, when operating in State A 902, power is supplied to all components in the network device and all components are ready.

When operating in State B, 904, one or more mechanical components are operating in a standby mode and are ready to respond in X seconds. In this state, the electronic components are ready.

When operating in State C, 906, one or more mechanical components are operating in a sleep mode and are ready to respond in Y minutes. In this state, the electronic components are ready.

When operating in State D, 908, one or more mechanical components are powered off and the electronic components are in a low power mode, but are still able to respond to requests.

When operating in State E, 910, one or more mechanical components are powered off and the electronic components are powered off except for a network connection. If a network signal is received at the network connection, then the network device may transition from State E 910 to State D 908 so that the network signal may be processed.

When operating in State F, 912, one or more mechanical components are powered off and the electronic components are power off except for a network connection and a timer. In this state, the network device may transition to State G 914 after a specified amount of time has elapsed with no requests for service made to the network device.

In State G, 914, the network device is shut down. The network device may enter this state in response to a manual power down of the network device or after transitioning from State F 912.

According to one embodiment of the invention, remote manager 128 causes the network device to change operational states based upon the satisfaction of one or more state change criteria. For example, remote manager 128 may cause the network device to transition from State A 902 to State B 904 if the network device has not received any communication after a specified amount of time. In this situation, remote manager 128 signals the network device to transition from State A 902 to State B 904 to reduce the amount of power consumed by the network device. If the network device receives a request for service, e.g., to print a document, the network device may itself transition from State B 904 back to State A 902 so that the specified function, i.e., the printing of the document, may be performed.

According to one embodiment of the invention, remote manager 128 determines whether the network device needs to perform the specified function, i.e., print an document, and if so, then the remote manager 128 signals the network device to transition from State B 904 to State A 902. On the other hand, if the network device does not receive a request for service within another specified amount of time, then the network device may transition from State B 904 to State C 906 to further conserve power by placing one or more mechanical components, such as a fuser, in a sleep mode. Alternatively, remote manager 128 may signal the network device to transition from State B 904 to State C 906 if the network device does not receive a request for service within the other specified amount of time.

Remote manager 128 may cause the network device to transition between any operational states, any number of times, at any position in hierarchy 900, depending upon the requirements of a particular implementation. For example, remote manager 128 may cause the network device to transition between State C 906 and State E 910, skipping State D 908. Remote manager 128 may also cause the network device to transition in either direction, up or down hierarchy 900.

Figures 10A, 10B, 10C:
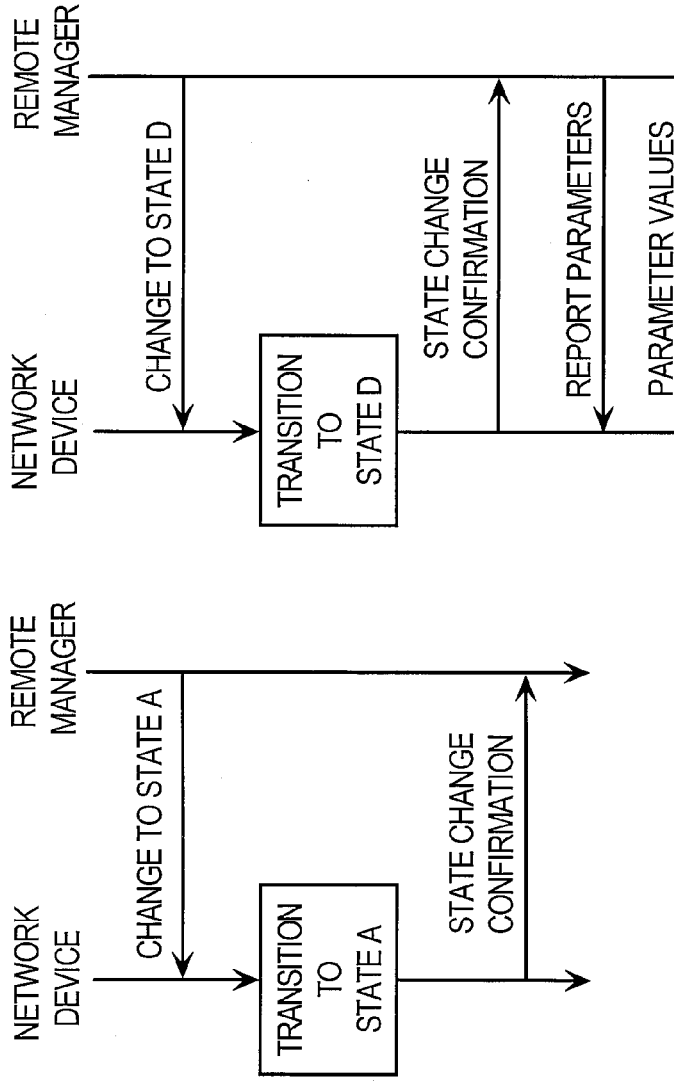
FIGS. 10A-10C are diagrams that depict example interactions between a network device and remote manager.

FIGS. 10A-10C are diagrams that depict example interactions between a network device and remote manager 128 according to an embodiment of the invention. FIG. 10A depicts interactions between the network device and remote manager 128 when one or more facility management functions are to be performed that requires that the network device be fully ready. In this situation, remote manager 128 sends to the network device a request for the network device to transition to State A 902. In response to receiving the request, the network device transitions to State A 902. The network device then generates and sends a state change confirmation message to remote manager 128. The state change confirmation message confirms that the network device successfully transitioned to State A 902.

FIG. 10B depicts interactions between the network device and remote manager 128 when remote manager 128 needs to retrieve the current operating parameters from the network device. Example operating parameters include, without limitation, the current status of the network device, a toner level and a page count. In this situation, the electronic components of the network device need to be at least in a low power mode. The mechanical components of the network device are not needed to perform this function. Accordingly, remote manager 128 sends to the network device a request that the network device transition to State D 908. In State D 908, the mechanical components of the network device are powered off and the electronic components of the network device are in a low power mode and can respond to requests.

In response to receiving the request, the network device transitions to State D 908. The network device may have been in any other state prior to receiving the request to transition to State D 908. The network device then generates and sends a state change confirmation message to remote manager 128. The state change confirmation message confirms that the network device successfully transitioned to State D 908. The remote manager 128 then generates and sends a request to report parameters to the network device. The network device sends its current parameter values to the remote manager 128.

FIG. 10C depicts interactions between the network device and remote manager 128 when remote manager 128 needs to receive a particular report from the network device. In this situation, the electronic components of the network device need to be at least in a low power mode. The mechanical components of the network device are not needed to perform this function. Accordingly, remote manager 128 sends to the network device a request that the network device transition to State D 908. In State D 908, the mechanical components of the network device are powered off and the electronic components of the network device are in a low power mode and can respond to requests.

In response to receiving the request, the network device transitions to State D 908. The network device may have been in any other state prior to receiving the request to transition to State D 908. The network device then generates the requested report and sends the report to remote manager 128. In this situation, a confirmation that the network device successfully transitioned to State D 908 is not generated and sent by the network device to the remote manager 128. Rather, receipt of the requested report by the remote manager 128 provides the confirmation that the network device successfully transitioned to State D 908. Thus, a state change confirmation message may not be required, depending upon the requirements of a particular implementation. For example, a monthly report of the system parameters such as print volume and toner consumption may be obtained using this approach.

Embodiments of the invention are described herein in terms of office applications. However, the approach may be applied to home environments to control the house heating system, the air conditioning system, the entertainment system, water heater and so on, when these appliances are connected through a network such as wireless home network to the control systems 102, 112 and 128.

VII. Example Multi-Function Peripheral (MFP) Architecture

One example of other devices 124 is a multi-function peripheral (MFP) that performs one or more functions, such as printing, copying, facsimile and scanning. A multitude of MFPs having a wide variety of combinations of functions is available and the invention is not limited to any particular type of MFP or an MFP configured to perform any particular combination of functions.

Figure 11:
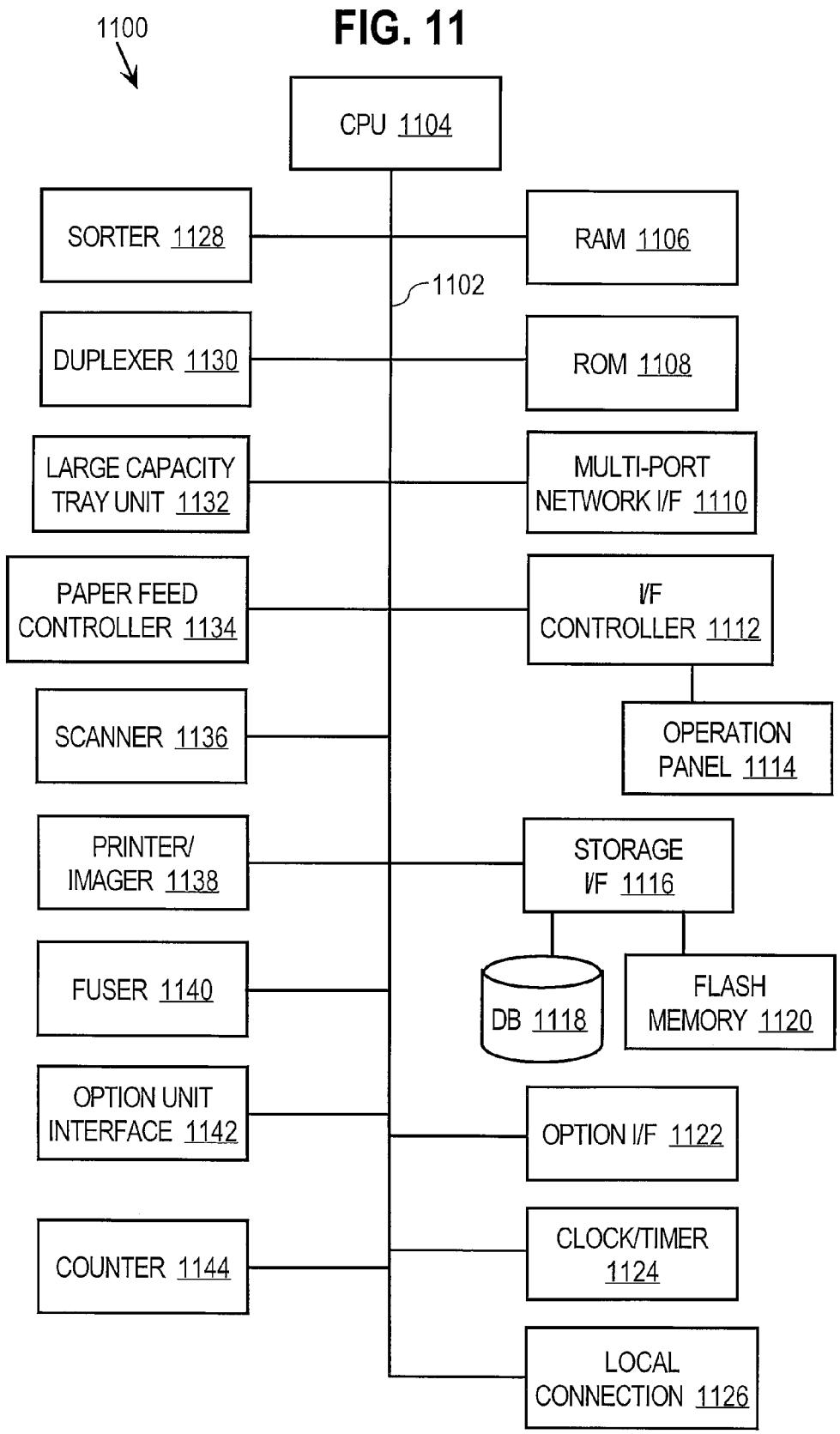
FIG. 11 is a block diagram that depicts an example implementation of an MFP.

FIG. 11 is a block diagram that depicts an example implementation 1100 of an MFP. Implementation 1100 includes several computer architecture components communicatively coupled via a communication bus 1102, namely, a central processing unit (CPU) 1104, a random access memory (RAM) 1106, a read-only memory (ROM) 1108, a multi-port network interface (I/F) 1110 that may be connected to both wired and wireless connections, an I/F controller 1112 with an attached operation panel 1114, a storage I/F 1116 with an attached database (DB) 1118 and flash memory 1120, an option I/F 1122, a clock/timer 1124 and a local connection 1126. Implementation 1100 also includes several physical components, such as a sorter 1128, a duplexer 1130, a large capacity tray unit 1132, a paper fee controller 1134, a scanner 1136, a printer/imager 1138, a fuser 1140 and an option unit interface 1142. The MFP elements depicted in FIG. 11 are provided as example elements and MFPs may contain additional elements or fewer elements, depending upon the requirements of a particular implementation.

VIII. Network Device Pre-Activation

As previously described herein, many network devices are configured to automatically transition to a low power state after a specified amount of time of inactivity has occurred. This allows network devices to manage and reduce their own power consumption. One of the drawbacks of this approach is that some network devices can require a substantial amount of time to transition back to a state where normal processing can resume. Some network devices with electro-mechanical components require a "warm-up" period before they can be used again.

For example, some printing devices are configured with a fuser that must be heated to a specified temperature before printing can occur. Fusers consume a relatively large amount of power compared to conventional electronic components. Thus, fusers are examples of components that are ideally suited for shutdown when a network device enters a standby mode because of the potential energy savings. Once a network device has entered a standby mode and a fuser has been allowed to cool however, a significant amount of time can be required for the network device to transition back to the fully operational mode. Thus, processing of the first task to be requested by the network device can be delayed. For example, suppose that a printing device is configured to transition into a standby mode after not receiving any print requests for at least a specified time. In the standby mode, power is removed from the fuser. When the next request is received, the printing device transitions from the standby mode to the full power mode. This includes providing power to the fuser so that the fuser can be brought up to operating temperature. This process may take several minutes, depending upon the particular configuration of the network device.

According to one embodiment of the invention, prior usage of a network device is used to estimate times when the network device will be used in the future. The network device is then pre-activated, i.e., transitioned to an active operational state, prior to the estimated times so that the network device will be ready when needed. This reduces or eliminates delays in processing attributable to having to wait for the network device to transition to the active operational state.

FIG. 12 is a block diagram 1200 that depicts an overview of an approach for managing a network device according to an embodiment of the invention. In step 1202, usage data is retrieved that indicates which of a plurality of operational states the network device was operating in during a first plurality of time periods. The operational states may include any number and type of operational states, such as low power, inactive or sleep states and full power or active states. The first plurality of time periods may represent any time periods, such as minutes, hours in a day, days, weeks, months, etc. Thus, for example, the usage data may indicate that the network device was operating in a sleep mode state during certain time periods from the first plurality of time periods and was operating in an active mode during other time periods from the first plurality of time periods.

In step 1204, the usage data is evaluated and one or more time periods are selected from a second plurality of time periods where it is estimated that the network device will be operating in a first operational state from the plurality of operational states. The first operational state may be, for example, a fully active operational state that is required for processing data.

In step 1206, the network device is pre-activated, i.e., transitioned to the first operational state, prior to each of the selected one or more time periods. For example, suppose that in step 1204, the evaluation of the usage data indicates that the network device is consistently operating in an active operational state during a particular time on a particular day. This may occur, for example, in a situation where a particular processing task is scheduled for the network device at the particular time on the particular day. The network device is transitioned to the active operational state prior to the particular time on the next day that is the same as the particular day. For example, suppose it is determined from the evaluation of the usage data that a printing device is heavily used during 1-3 pm on Tuesdays. The printing device is pre-activated into an operational state that allows printing prior to 1 pm each Tuesday.

A. Usage Data

FIG. 13 includes a graph 1300 that visually depicts the usage of a network device over time and more specifically, the usage of the network device over a 24 hour period. The network device may be any type of network device, such as PC 118, copy machine 120, laboratory equipment 122 or other devices 124, such as routers, gateways, switches or other network elements. As indicated by graph 1300, the usage of the network device varies significantly throughout a 24 hour period. This variation may be attributable to a variety of factors, and in the present example, is attributable to a typical work schedule. In the present example, graph 1300 depicts relatively high levels of network traffic and/or network device usage during the peak morning hours of 8-12 am and the peak afternoon hours of 1:30-6 pm, with usage tapering off during the conventional lunch hour and from 6-8 pm as employees work later and then depart.

What constitutes "usage" of a network device may vary depending upon a particular implementation. For example, usage may refer to the fact that a network device is processing data, e.g., when a printing device is processing print data the network device is considered to be used. As another example, usage may refer to the fact that a network device is operating in a particular operational state. Suppose that a printing device has two operational states. One state is a normal operational state where the printing device is ready to process print data. The other operational state is a low power or sleep state where the printing device is not ready to process print data, but consumes less power. In this situation, the printing device may be considered used when the printing device is operating in the normal operational state.

The usage depicted in graph 1300 is only one of a myriad of possible usage patterns and the invention is not limited to any particular usage pattern. The usage of any particular network device may vary dramatically from other network devices, depending upon a particular context or application. For example, one printing device used by employees during the daytime may experience little or no usage during nighttime hours and therefore may operate in a low power or sleep mode during nighttime hours. Another printing device may be used extensively during the nighttime to print large reports, such as financial reports, that are needed early in the morning. Similarly, certain network devices that include backup mechanisms may be scheduled for operation during nighttime to reduce the strain on computational resources during the daytime.

B. Collecting and Storing Usage Data

Usage data may be collected and maintained using a variety of techniques and the invention is not limited to any particular technique. For example, usage data may be collected by network devices and provided to a central processing mechanism, such as power manager 126. The network devices may collect usage data in response to a request from power manager 126 or they may operate autonomously and collect usage data themselves. The network devices may then automatically provide the collected usage data to a central processing mechanism or store the usage data locally and provide the usage data in response to a query from a central processing mechanism. Alternatively, a monitoring mechanism may be used to monitor the activity of network devices and generate usage data. For example, power manager 126 may configured with a monitoring function to monitor the usage of PC 118, copy machine 120, laboratory equipment 122 and other devices 124 and generate usage data. Usage data may be stored at network devices or at a central processing mechanism in volatile or non-volatile memory, depending upon the requirements of a particular application. According to one embodiment of the invention, usage data is stored in non-volatile memory, such as flash memory, so that the data is maintained even if a device powers down or power is lost.

Usage data may reflect the usage of a network device over various periods of time. For example, graph 1300 may reflect the usage of a network device over a single 24-hour period. Alternatively, graph 1300 may reflect the usage of a network device over multiple 24-hour periods. Thus usage data may be collected over time and then processed. For example, usage data for a device may be collected over time and then averaged for specified time periods to provide an indication of the average usage during each time period. Other statistical methods may also be used to process usage data, depending upon the requirements of a particular application.

FIG. 14 depicts a table 1400 of example usage data collected for a printing device over a seven-day, 24 hours per day, period. A usage counter is used to track the number of times that the printing device operates in a particular operational state and processes print data, e.g., by printing electronic documents, during each 15 minute time period. As depicted in table 1400, the printing device is not processing print data late in the night (23:30; 23:45) and very early in the morning (00:00 through 00:30), except on Sunday, when special reports are printed for Monday morning. Table 1400 also depicts that the printing device is used most during the morning and afternoon and less during lunch and after normal business hours. In the example depicted in table 1400, the counter data reflects how often the printing device operates in one particular operational state. Counter data may be collected for any number of operational states, however, for example in situations where devices have several operational states.

The counter data may reflect time periods of different lengths, not just 15 minutes as depicted in table 1400. Furthermore, the counter data in table 1400 may represent an average of n number of weekly samples. For example, a sample counter 1402 indicates the number of weeks (n weeks) that the counter data reflects. Thus, the count of eight for the Tuesday 09:45 time period may represent an average count of nine for n number of Tuesday 09:45 time periods. The number of samples may be selected based upon the requirements of a particular implementation. The number of samples may also be tracked for each separate day. For example, a separate sample counter may be maintained for each day of the week. In this situation, the usage count for a particular day represents an average usage count for that day, based upon the number of samples for that day. Other statistical measures may be used besides average, such as median, mode, etc., and the invention is not limited to any particular statistical measure. Although FIG. 14 depicts the usage data in the form of a table, the invention is not limited to this context and usage data may be stored in any data format, data structure or arrangement.

The usage counter may be implemented in the printing device and the counter data may be provided automatically to a central processing mechanism, such as power manager 126, or queried from the printing device by power manager 126. Alternatively, some other mechanism may be used to collect the counter data.

C. Using Usage Data to Estimate Future Usage of a Network Device

According to one embodiment of the invention, usage data, that indicates when a network device has been used in the past, is used to estimate when network device will be used in the future. A variety of techniques may be used to analyze usage data to estimate when a network device will be used. For example, the average activity of a network device may be determined from usage data. Then, any time periods having an amount of activity greater than the average amount of activity are identified as time periods when the network device should be pre-activated. As another example, suppose that a usage counts are used to track the usage of a network device, as depicted in FIG. 14. According to one embodiment of the invention, in this situation, each usage count is compared to a specified threshold. Time periods that have a usage count greater than the specified threshold are identified as time periods when the network device should be pre-activated.

The particular threshold used may vary depending upon the requirements of a particular implementation and may be established, for example, by configuration data and/or through a graphical user interface (GUI). Suppose that the threshold is established at seven. In this situation, there are four time periods in table 1400 that have a usage count greater than seven: 15:00 on Monday; 09:45 on Tuesday; and 09:45 and 10:00 on Thursday. The network device is then activated prior to these times on these days so that delays attributable to activating the network device do not cause delays in processing data. The pre-activation may be repeated the same time and day each week until a change is warranted. In situations where such a transition may take several minutes, for example to allow time for a fuser to reach a threshold temperature, the transition is performed prior to the printing device actually being needed, which reduces delays when print jobs or print data is later processed. For example, suppose that a particular printing device requires six minutes to transition from a sleep or inactive operational state into an active operational state where the printing device is capable of processing and printing print data. In this situation, the particular printing device is transitioned into the active state at least six minutes prior to time periods where it is estimated, based upon usage data, that the particular printing device will be needed.

The use of a threshold may be combined with other approaches to select time periods for pre-activation. Rather than selecting for pre-activation all time periods having a usage count greater than a specified threshold, a subset of qualifying time periods may be selected. For example, the n number of time periods having the highest usage count greater than the specified threshold may be selected for pre-activation. Suppose that the threshold is established at seven and n is established at two. In this situation, there are four time periods in table 1400 that have a usage count greater than seven: 15:00 on Monday; 09:45 on Tuesday; and 09:45 and 10:00 on Thursday. The two time periods having the highest usage count, namely, 15:00 on Monday and 09:45 on Thursday, are selected for pre-activation. The network device is then activated prior to these times on these days so that delays attributable to activating the network device do not cause delays in processing data.

According to one embodiment of the invention, a minimum number of samples are required before pre-activation is used. For example, a particular implementation may specify that a minimum of ten samples is required before pre-activation is used. In this situation, the value of sample counter 1402 is checked against a specified threshold to determine whether usage data reflects a sufficient number of samples. If so, then times to use pre-activation are selected as previously described herein. If not, the pre-activation is not used and the network device is allowed to operate according to its normal configuration. This approach may be used on any size time periods, based upon the availability of sample counters. For example, if separate sample counters are maintained for each day in a week (seven), then the use of pre-activation as described herein may be made on a per-day basis.

D. Updates to Usage Data

In some situations, the usage of network devices changes over time. This may be attributable to a wide variety of factors, such as changes in network or network device configurations, relocation of network devices, relocation of users, changes in the type of work being done by users and changes in users' work habits and work schedules. According to one embodiment of the invention, usage data is periodically updated and re-evaluated to determine whether any changes should be made to the pre-activation schedule of network devices.

E. Using Pre-Activation With Building Access Detection

The pre-activation of network devices as described herein may be used in conjunction with building access detection. According to one embodiment of the invention, pre-activation may be temporarily suspended based when it is known that certain people are absent from a building, for example, during a company shutdown. A counter flag may be set to disable pre-activation for this purpose. The counter flag may then be reset at the end of a shutdown period. When the counter flag is set to disable pre-activation, the incrementing of the sample count may also be disabled, so that usage data collected during that period is not used.

According to another embodiment of the invention, normally-scheduled pre-activation of a particular network device is temporarily suspended if none of the persons who are associated with the particular network device are in the building. For example, suppose that laboratory equipment 122 is scheduled for pre-activation on Tuesdays at 9 am, based upon usage data, as described herein. Suppose further that on the next Tuesday at 9 am, none of the individuals associated with laboratory equipment 122 are in the building. This may be known, for example, from building access system 102. In this situation, pre-activation of laboratory equipment 122 is temporarily suspended. If, at the next pre-activation period, one or more persons associated with laboratory equipment 122 are in the building, then pre-activation may continue normally.

IX. Approach for Determining Alternative Printing Device Arrangements

According to one embodiment of the invention, an approach is provided for determining alternative printing device arrangements. In general, the geographic locations, usage and costs of an existing set of printing devices are analyzed. A determination is made, based upon this analysis, whether one or more of the existing printing devices can be replaced by one or more replacement printing devices to provide an alternative printing device arrangement that has lower costs. The lower costs may reflect lower operational costs, lower energy costs, lower acquisition costs, or any combination of lower operational costs, lower energy costs and lower acquisition costs. The results of the determination may be presented to a user, for example, via a graphical user interface. The approach may be implemented in a variety of locations, depending upon a particular implementation. For example, according to one embodiment of the invention, the approach is implemented by a printing device arrangement analyzer 132. The approach may be implemented anywhere in a network however, including on printing devices.

Figure 15A:
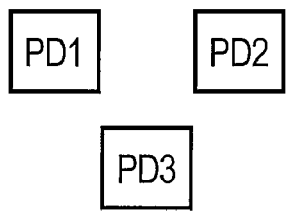
FIG. 15A is a block diagram depicting an example arrangement of existing printing devices.

FIG. 15A is a block diagram depicting an example existing arrangement of printing devices, identified as PD1, PD2 and PD3. Printing devices PD1-PD3 may be any type of printing device and the approaches described herein are not limited to any particular type of printing device. Example printing devices include, without limitation, printers, copy machines and multi-function peripheral devices (MFPs). Each printing device PD1-PD3 supports certain options and features. As used herein, the term "option" of a printing device refers to a functional capability. Example options include, without limitation, duplex printing, color printing, sorting, stapling, hole punching and binding. As used herein, the term "feature" of a printing device refers to a value of an option. For example, for the hole punch option, example features would indicate the number and locations of holes, such as "3L", e.g., three holes on the left side, or "2R", e.g., two holes on the right side. Printing devices PD1-PD3 may have some options and features in common, or may have different options and features. For example, printing devices PD1 and PD2 may both offer printing in black & white, while printing device PD3 offers printing in both black & white and color.

Figure 15B:
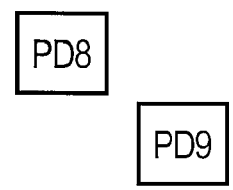
FIG. 15B is a block diagram that depicts an alternative arrangement of printing devices.

FIG. 15B is a block diagram that depicts an alternative print device arrangement, wherein printing devices PD1, PD2 and PD3 have been replaced by a replacement printing devices PD8 and PD9. The alternative arrangement of printing devices, which includes printing devices PD8 and PD9, has lower costs than the existing printing device arrangement depicted in FIG. 15A.

Figure 16:
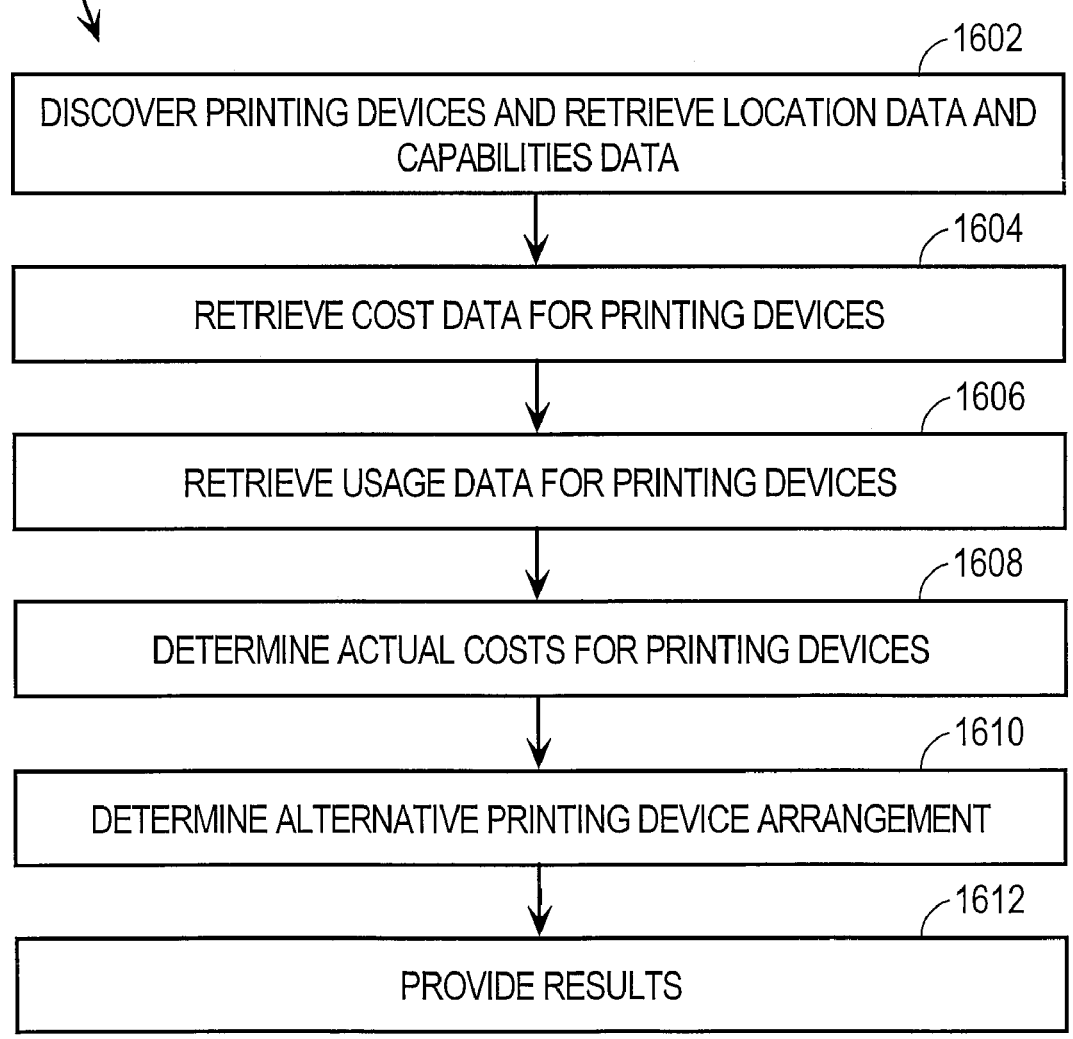
FIG. 16 is a flow diagram that depicts an approach for determining alternative printing device arrangements.

FIG. 16 is a flow diagram 1600 that depicts an approach for determining alternative printing device arrangements, according to one embodiment of the invention. In step 1602, a set of existing printing devices is discovered and location data and capabilities data for the existing printing devices is retrieved. The existing printing devices may be located, for example, within a business organization that desires to know whether any alternative printing device arrangements are available that have lower costs than the existing printing device arrangement. For purposes of explanation, it is presumed that the set of printing devices PD1-PD3 of FIG. 15A are discovered.

Discovery of a printing device may include obtaining a wide variety of information about the printing devices. Example information includes, without limitation, a name, IP address and other basic information, such as the type of printing device. The discovery of printing devices may be performed using a wide variety of techniques, depending upon a particular implementation, and the invention is not limited to any particular discovery technique. For example, a query may be made to a network management server that tracks all available printing devices. The network management server responds with a list of all available printing devices. As another example, a multicast message may be sent over a network requesting that available printing devices identify themselves.

Once a set of existing printing devices is discovered, location data and capabilities data are retrieved for the printing devices. The location data indicates geographical location(s) of the printing devices. A geographical location may be expressed in different terms, depending upon a particular implementation. For example, the location data may indicate a particular building by name or address, and a location within the building, such as a floor, area and/or room within the building. The capabilities data indicates the options and features of the printing devices.

FIG. 17 depicts a table 1700 that stores example location data and device capabilities data for printing devices PD1-PD3. In this example, table 1700 includes a device name, a device vendor, an IP address, a geographical location and a list of device capabilities. The information included in table 1700 is example information and different and/or additional information may be maintained, depending upon a particular implementation. Table 1700 may be maintained by printing device arrangement analyzer 132, or by other mechanisms and processes.

In step 1604, cost data is retrieved for the existing set of printing devices. Cost data may be retrieved from a variety of sources. For example, cost data may be retrieved from a network management server that maintains cost information. As another example, cost data may be retrieved from printing devices, from vendors, manufacturers or from third parties. For example, many printing device manufacturers provide cost information over the Internet. Cost data may also be retrieved from a user, for example an administrator, via a graphical user interface.

The cost data may indicate a wide variety of costs for a printing device. For example, the cost data may indicate the operating costs of a printing device. Operating costs may reflect the cost of consumables or parts that have a limited lifespan and therefore must periodically be replaced. Examples of such consumables and parts are toner cartridges, fusers and rollers. To the extent that particular printing devices use specialized consumable items, such as special staples or paper, these costs may also be reflected in the operating costs. Operating costs may also reflect the cost of periodic maintenance that must be performed, separate from the cost of consumables or parts. For example, periodic maintenance may include cleaning and/or adjustment of internal parts and mechanisms.

The cost data may also reflect acquisition costs of printing devices, for example, the cost to purchase a printing device. Acquisition costs may be considered as a lump sum, or amortized over the useful life of the printing device. For example, given a cost C and a useful life of L years, the cost attributable to one year of service is C/L.

The cost data may also reflect energy costs for operating a printing device. Energy costs may be calculated and/or estimated based upon the prior usage of an existing printing device and the energy consumption of the printing device when active and inactive. Alternatively, wireless metering devices may be attached to the power sources to measure actual power usage of devices. For example, most printing devices have at least one active and one inactive operational state, e.g., a "sleep state". Printing devices consume more energy in the active state relative to the inactive state. Most manufacturers provide data indicating the amount of energy consumed by a printing device when the printing device is operating in the active and inactive states. Printing devices may also have multiple active and inactive states that reflect different levels of readiness.

Embodiments of the invention are described hereinafter in the context of determining alternative printing device arrangements that have a lower operating cost than an existing printing device arrangement. The approach may be used to satisfy other objectives however, including determining alternative printing device arrangements that have a lower energy cost or lower acquisition cost than an existing printing device arrangement, irrespective of the relative operating costs of the arrangements.

FIG. 18 depicts a table 1800 that stores example cost data for printing device PD1. Table 1800 includes operating costs, reflected in the costs of a toner cartridge, fuser and roller. Table 1800 also includes energy costs and acquisition costs for printing device PD1. Table 1800 may be maintained by printing device arrangement analyzer 132, or by other mechanisms and processes.

In step 1606, usage data is retrieved for the set of existing printing devices. The usage data indicates the usage of the existing printing devices during a specified time and may include details about particular options used for each printing device during the specified time. For example, the usage data may indicate a number of pages that were printed during the specified time, along with other details, such as whether the pages were printed in black & white or color, the type of media used, as well as other processing options, such as hole punching, stapling, binding, etc. A counter 1144 or similar mechanism or process may be used to collect and store usage data for the set of existing printing devices. The usage data collected may include the number of jobs and the number of pages printed for each job. The usage data may be collected by Usage Data Collector 2008 (FIG. 21) using polling. Alternatively, a printing device may report to the printing device arrangement analyzer 132 using one of various Internet protocols. One example of such a protocol is Simple Object Access Protocol (SOAP) over HTTP.

In step 1608, actual costs are determined for the set of existing printing devices. According to one embodiment of the invention, the actual costs are determined based upon the cost data and the usage data for the set of existing printing devices. For example, the operating costs for printing device PD1 during a specified time may be calculated based upon the cost data in Table 1800 and the usage of printing device during the specified time. Consider the following example. Suppose that during a specified time of one month the printing device PD1 was used to print 5,000 pages and operated in an active state for 20 hours. The actual total operating cost for the toner cartridge, fuser and roller is $37.50+$17.5+$5, for a total of $60. The actual energy cost attributable to the printing device operating in the active state is $60, assuming a cost of $0.01 per watt per hour (20*300*$0.01). For purposes of simplicity, only energy costs attributable to the printing device operating in the active state were considered and energy costs attributable to the printing device operating in an inactive state, e.g., a "sleep state", were not considered. Assuming the specified time of one month, the acquisition cost is $83.33 ($7000/84). So, the total cost for printing device PD1 during the specified time is $203.33 ($60+$60+ $83.33). Depending upon a particular implementation, some or all of the costs may be included in the actual cost. For example, in some implementations, only the operational costs may be considered. In other implementations, only energy costs or acquisition costs may be considered, etc.

In step 1610, an alternative printing device arrangement is determined that has a lower cost than the existing set of printing devices. The determination is made based upon the actual costs for the exiting printing devices and estimated costs for one or more replacement printing devices.

According to one embodiment of the invention, the estimated cost for a replacement printing device is determined using the same approach just described for determining the actual costs for one or more existing printing devices, except that the costs for the replacement printing device are used instead of the costs for the existing one or more printing devices. Thus, the usage data for the one or more existing printing devices and the cost data for the replacement printing device are used to determine an estimated cost for the replacement printing device. For example, referring to FIGS. 15A and 15B, the usage data for existing printing devices PD1, PD2 and PD3 and the cost data for replacement printing devices PD8 and PD9 are used to determine an estimated cost for replacement printing devices PD8 and PD9. If the estimated cost of the replacement printing devices is less than the actual costs for one or more existing printing devices, then the replacement printing device are considered for the alternative printing device arrangement. The costs considered in the determination may include any number and types of costs, depending upon a particular implementation. For example, the determination may include consideration of operational costs, energy costs and acquisition costs, or any combination of operational costs, energy costs and acquisition costs.

Although in the prior example, three existing printing devices are replaced with two replacement printing devices, an alternative printing device arrangement may include the substitution of any number of existing printing devices with any number of replacement printing devices. While many alternative printing device arrangements will have fewer printing devices than existing printing device arrangements, some alternative printing device arrangements may have the same number or even a greater number of printing devices as existing printing device arrangements. For example, an alternative printing device arrangement may include printing devices PD1, PD8 and PD9. Furthermore, any number of alternative printing device arrangements may be determined, based upon a particular implementation. For example, up to N number of alternative printing device arrangements may be determined, where N is a number specified, for example, by an administrator, or by a user via a user interface of printing device arrangement analyzer 132. As described in more detail hereinafter, one or more of the N number of alternative printing device arrangements may be displayed on a graphical user interface. The approach may include testing a large number of alternative printing device arrangements to identify alternative printing device arrangements with lower costs than the existing printing device arrangement.

According to one embodiment of the invention, an alternative printing device arrangement includes all of the options that are included the existing printing device arrangement and that were used during the specified time. This ensures that users have access to the same printing options with the alternative printing device arrangement that were used with the existing printing device arrangement during the specified time. There may be situations where a candidate alternative printing device arrangement has lower costs than the existing printing device arrangement, but does not have one or more options that were used with the existing printing device arrangement during the specified time. If the particular option that was used in the existing printing device arrangement and not included in the alternative printing device arrangement is considered to be a minor option that some users might elect not to use, then the candidate alternative printing device arrangement is still considered.

FIG. 19 depicts a table 1900 that stores information for an existing printing device arrangement that includes printing devices PD1-PD3. Table 1900 includes the same information as table 1700, but also includes cost data for each printing device PD1-PD3, as well as a total cost for the arrangement.

The cost data is example cost data and may reflect a wide variety of costs, such as operational costs, energy costs and acquisition costs. In this example, the total cost for the printing device arrangement during the specified time was $750.

FIGS. 20A-20D depict tables 2010-2040 that store information for candidate alternative printing device arrangements determined in accordance with an embodiment of the invention. In the candidate alternative printing device arrangement in table 2010 of FIG. 20A, printing devices PD2 and PD3 have been replaced with a replacement printing device PD4. Thus, this candidate alternative printing device arrangement has fewer printing devices (two) than the existing printing device arrangement (three). Printing device PD4 has a lower cost than the combined cost of printing devices PD2 and PD3 and has a higher printing rate than printing devices PD2 and PD3. The candidate alternative printing device arrangement depicted in FIG. 20A includes all of the device capabilities of the existing printing device arrangement in FIG. 19.

In the candidate alternative printing device arrangement in table 2020 of FIG. 20B, printing devices PD2 and PD3 have been replaced with replacement printing devices PD5-PD7. Thus, this candidate alternative printing device arrangement has more printing devices (four) than the existing printing device arrangement (three). Printing devices PD5-PD7 have a combined lower cost than the combined cost of printing devices PD2 and PD3 and have a higher printing rate than printing devices PD2 and PD3. The candidate alternative printing device arrangement depicted in FIG. 20B includes all of the device capabilities of the existing printing device arrangement in FIG. 19.

In the candidate alternative printing device arrangement in table 2030 of FIG. 20C, all three existing printing devices PD1-PD3 have been replaced with replacement printing devices PD8 and PD9. Thus, this candidate alternative printing device arrangement has fewer printing devices (two) than the existing printing device arrangement (three), and all of the existing printing devices PD1-PD3 have been replaced by two replacement printing devices PD8 and PD9. Printing devices PD8 and PD9 have a combined lower cost than the combined cost of printing devices PD2 and PD3 and include all of the device capabilities of the existing printing device arrangement in FIG. 19.

In the candidate alternative printing device arrangement in table 2040 of FIG. 20D, printing devices PD2 and PD3 have been replaced with a replacement printing device PD10. Thus, this candidate alternative printing device arrangement has fewer printing devices (two) than the existing printing device arrangement (three). Printing device PD10 has a lower cost than the combined cost of printing devices PD2 and PD3 and has a higher printing rate than printing devices PD2 and PD3. Note that in this example, the candidate alternative printing device arrangement depicted in FIG. 20D has a lower cost than the existing printing device arrangement, but this candidate alternative printing device arrangement does not include all of the device capabilities of the existing printing device arrangement in FIG. 19. More specifically, this alternative printing device arrangement does not including stapling capability. In some embodiments of the invention, this alternative candidate printing device may not be provided as an alternative printing device arrangement, for example, if the missing capability was used by the existing printing device arrangement during the specified time. Alternatively, even if the missing capability was used by the existing printing device arrangement during the specified time, the candidate alternative printing device arrangement may be provide in a manner that indicates that the particular capability, in this example stapling, is not included in the candidate alternative printing device arrangement.

In step 1612, results of the process are provided. The results may be provided in a wide variety of forms, depending upon a particular implementation. For example, results may be provided in a data file and/or displayed on a graphical user interface. When displayed on a graphical user interface, the results may be displayed using a wide variety of techniques, depending upon a particular implementation, and the approach is not limited to any particular technique for displaying results. For example, candidate alternative printing device arrangements may be presented on a graphical user interface, along with data that indicates the costs and device capabilities of the printing devices included in the candidate alternative printing device arrangements. According to one embodiment of the invention, N number of candidate alternative printing device arrangements are displayed on a graphical user interface, where N is an integer value that is selected by a user.

In the situation where a candidate alternative printing device arrangement does not include an option that was used during the specified time, then the graphical user interface may indicate this situation. For example, a message may be displayed to indicate that the candidate alternative printing device arrangement does not include the particular option that was used by the existing printing device arrangement during the specified time. This notifies the user that although the candidate alternative printing device arrangement is attractive from a cost standpoint, it does not provide all of the options used by the existing printing device arrangement and therefore allows the user to make a more informed decision about whether to implement a candidate alternative printing device arrangement.

The display of candidate alternative printing device arrangements may include location data to visually depict the locations of existing printing devices. For example, user interface objects representing existing printing devices may be displayed in a manner to show their relative locations within a building. This provides additional information that may enable a user to make a better decision about whether to adopt a candidate alternative printing device arrangement. For example, in the situation where a candidate alternative printing device arrangement has fewer printing devices than an existing printing device arrangement, then it is helpful for a user to see the geographic locations of the existing printing devices and the proposed substitutions in a candidate alternative printing device arrangement so that the user can decide whether to implement the candidate alternative printing device arrangement.

Figure 21:
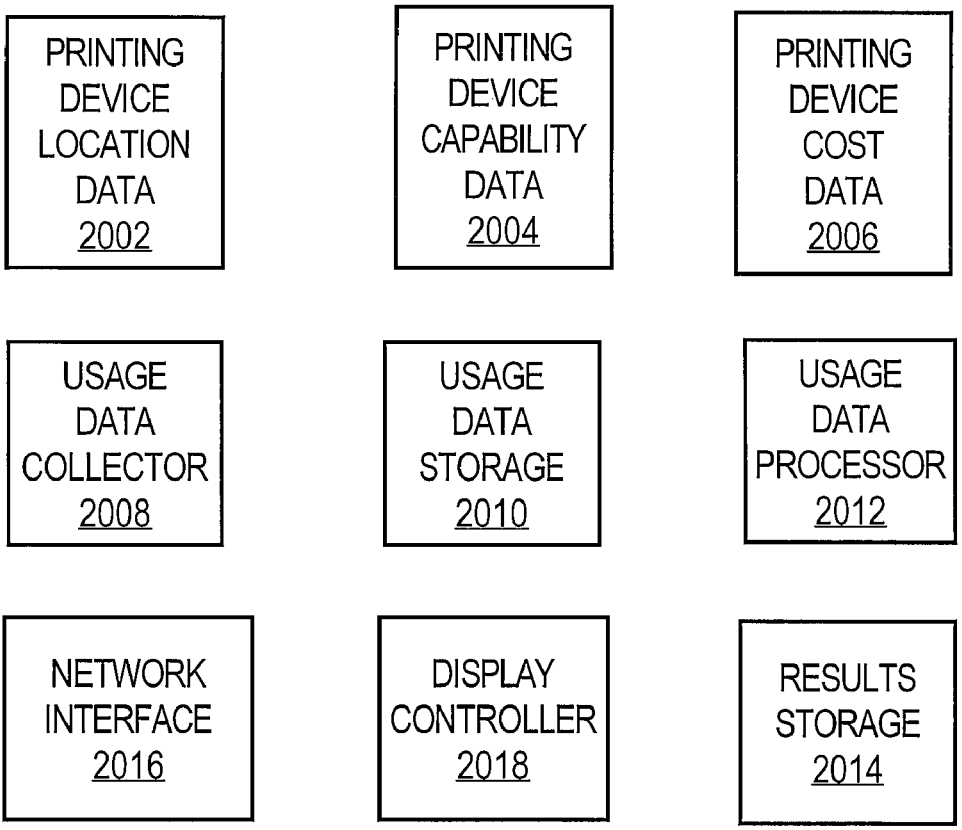
FIG. 21 depicts an example logical implementation of a printing device arrangement analyzer.

FIG. 21 depicts an example logical implementation 2100 of printing device arrangement analyzer 132. For purposes of explanation, data elements, storage elements and functional elements are depicted together in logical implementation 2100, but it is understood that they may be separate in various implementations. The various elements depicted in FIG. 21 may be implemented in hardware, computer software, or any combination of hardware and computer software.

Printing device location data 2002 is data that identifies the geographic location of printing devices. Printing device capability data 2004 indicates the options and features of the printing devices and may also indicate other attributes of printing devices. Printing device cost data 2006 indicates costs of printing devices. The costs may include operational costs, energy costs and acquisition costs. Printing device location data 2002, printing device capability data 2004 and printing device cost data 206 may be stored in a variety or formats, depending upon a particular implementation. For example, this data may be stored in standard data files, a markup language such as XML, or in a database.

Usage data collector 2008 collects usage data from printing devices and stores the usage data in usage data storage 2010. The usage data indicates the usage of the existing printing devices during a specified time and may include details about particular options used for each printing device during the specified time. Usage data collector 2008 may be implemented as a centralized network process, or as one or more processes implemented on printing devices. For example, a printing device may be configured with a usage data collector 2008 that collects usage data and makes the usage data available to printing device arrangement analyzer 132. The usage data may be stored on the printing devices and then requested by printing device arrangement analyzer 132 when an analysis is to be performed. Alternatively, the usage data collectors 2008 on the printing devices may automatically provide the usage data to printing device arrangement analyzer 132.

Usage data processor 2012 processes usage data stored in usage data storage 2010 in conjunction with printing device location data 2002 and printing device cost data 2006 to determine alternative printing device arrangements, as previously described herein. The results of this process are stored in results storage 2014. Network interface 2016 provides network connectivity between printing device arrangement analyzer 132 and a network and may also be involved in processing data received over the network. For example, network interface 2016 may be involved in obtaining printing device capability data 2004 from printing devices and obtaining printing device cost data 2006, either from printing devices, manufacturer databases or Websites, third party databases or Websites databases, or other locations. Results of the determining alternative printing device configurations may be displayed via display controller 2018.

Although examples of the approach has been discussed in the context of using costs, a similar method can be applied to determine the expected power consumption under the alternative printing device arrangement. The expected power consumption computation may be made based upon the usage data, for example, the number of jobs and number of pages per job. The job information provides the start-up power consumption from the sleep state and number of pages per job provides the power consumption for the job. If the job frequency is high, the start-up power consumption may be reduced due to residual heat."

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for determining an alternative printing device arrangement, the computer-implemented method comprising:

retrieving first printing device cost data for an existing printing device arrangement that indicates at least costs of printing on one or more printing devices in the existing printing device arrangement using one or more options supported by the one or more printing devices in the existing printing device arrangement;

retrieving printing device usage data that indicates usage of the one or more printing devices in the existing printing device arrangement during a first specified time and the one or more options for the one or more printing devices in the existing printing device arrangement used during the first specified time;

determining, based upon the printing device usage data and the first printing device cost data for the existing printing device arrangement, actual costs for operating the one or more printing devices in the existing printing device arrangement during the first specified time;

retrieving second printing device attribute data that indicates at least one or more options supported by one or more replacement printing devices that are not included in the existing printing arrangement;

retrieving second printing device cost data that indicates at least costs of printing on the one or more replacement printing devices using the one or more options supported by the one or more replacement printing devices;

a computer system determining an alternative printing device arrangement that has a lower estimated cost of operation during the first specified time than the actual cost of operating the one or more printing devices in the existing printing device arrangement during the first specified time, wherein the estimated cost for operating the alternative printing device arrangement during the first specified time is determined based at least upon the one or more options for the one or more printing devices in the existing printing device arrangement that were used during the first specified time as indicated by the usage data, the second printing device attribute data and the second printing device cost data, wherein the alternative printing device arrangement does not include at least one of the one or more printing devices in the existing printing device arrangement and includes one or more of the one or more replacement printing devices that are not included in the existing printing arrangement, and the computer system storing in a memory data that represents the alternative printing device arrangement.

2. The computer-implemented method as recited in claim 1, wherein the actual costs for operating the one or more printing devices in the existing printing device arrangement during the first specified time include costs attributable to energy consumed by the one or more printing devices during the first specified time and the estimated cost for operating the alternative printing device arrangement is further determined based upon energy that would have been consumed by the alternative printing device arrangement during the first specified time.

3. The computer-implemented method as recited in claim 1, wherein the actual costs for operating the one or more printing devices in the existing printing device arrangement during the first specified time include acquisition costs of the one or more printing devices attributable to the first specified time and the estimated cost for operating the alternative printing device arrangement is further determined based upon acquisition costs of one or more printing devices in the alternative printing device arrangement attributable to the first specified time.

4. The computer-implemented method as recited in claim 1, wherein the estimated cost for operating the alternative printing device arrangement during the first specified time is further determined based upon an estimated cost for operating the one or more of the one or more replacement printing devices during the first specified time.

5. The computer-implemented method as recited in claim 1, wherein one or more of the one or more printing devices in the existing printing device arrangement that are replaced satisfy specified geographic location constraints.

6. The computer-implemented method as recited in claim 5, wherein the specified geographic location constraints include one or more of a maximum distance between printing devices and the printing devices are located on the same floor of a building.

7. The computer-implemented method as recited in claim 1, wherein the alternative printing device arrangement includes the one or more options for the one or more printing devices in the existing printing device arrangement used during the first specified time.

8. A non-transitory computer-readable medium for determining an alternative printing device arrangement, the computer-readable medium storing instructions which, when processed by one or more processors, cause:
retrieving first printing device cost data for an existing printing device arrangement that indicates at least costs of printing on one or more printing devices in the existing printing device arrangement using one or more options supported by the one or more printing devices in the existing printing device arrangement;
retrieving printing device usage data that indicates usage of the one or more printing devices in the existing printing device arrangement during a first specified time and the one or more options for the one or more printing devices in the existing printing device arrangement used during the first specified time;
determining, based upon the printing device usage data and the first printing device cost data for the existing printing device arrangement, actual costs for operating the one or more printing devices in the existing printing device arrangement during the first specified time;
retrieving second printing device attribute data that indicates at least one or more options supported by one or more replacement printing devices that are not included in the existing printing arrangement;
retrieving second printing device cost data that indicates at least costs of printing on the one or more replacement printing devices using the one or more options supported by the one or more replacement printing devices; and
a computer system determining an alternative printing device arrangement that has a lower estimated cost of operation during the first specified time than the actual cost of operating the one or more printing devices in the existing printing device arrangement during the first specified time, wherein the estimated cost for operating the alternative printing device arrangement during the first specified time is determined based at least upon the one or more options for the one or more printing devices in the existing printing device arrangement that were used during the first specified time as indicated by the usage data, the second printing device attribute data and the second printing device cost data,
wherein the alternative printing device arrangement does not include at least one of the one or more printing devices in the existing printing device arrangement and includes one or more of the one or more replacement printing devices that are not included in the existing printing arrangement, and
the computer system storing in a memory data that represents the alternative printing device arrangement.

9. The non-transitory computer-readable medium as recited in claim 8, wherein the actual costs for operating the one or more printing devices in the existing printing device arrangement during the first specified time include costs attributable to energy consumed by the one or more printing devices during the first specified time and the estimated cost for operating the alternative printing device arrangement is further determined based upon energy that would have been consumed by the alternative printing device arrangement during the first specified time.

10. The non-transitory computer-readable medium as recited in claim 8, wherein the actual costs for operating the one or more printing devices in the existing printing device arrangement during the first specified time include acquisition costs of the one or more printing devices attributable to the first specified time and the estimated cost for operating the alternative printing device arrangement is further determined based upon acquisition costs of one or more printing devices in the alternative printing device arrangement attributable to the first specified time.

11. The non-transitory computer-readable medium as recited in claim 8, wherein the estimated cost for operating the alternative printing device arrangement during the first specified time is further determined based upon an estimated cost for operating the one or more of the one or more replacement printing devices during the first specified time.

12. The non-transitory computer-readable medium as recited in claim 8, wherein one or more of the one or more printing devices in the existing printing device arrangement that are replaced satisfy specified geographic location constraints.

13. The non-transitory computer-readable medium as recited in claim 12, wherein the specified geographic location constraints include one or more of a maximum distance between printing devices and the printing devices are located on the same floor of a building.

14. The non-transitory computer-readable medium as recited in claim 8, wherein the alternative printing device arrangement includes the one or more options for the one or more printing devices in the existing printing device arrangement used during the first specified time.

15. An apparatus for determining an alternative printing device arrangement, the apparatus comprising:
one or more processors;
a memory storing instructions which, when processed by one or more processors, causing:
retrieving first printing device cost data for an existing printing device arrangement that indicates at least costs of printing on one or more printing devices in the existing printing device arrangement using one or more options supported by the one or more printing devices in the existing printing device arrangement;
retrieving printing device usage data that indicates usage of the one or more printing devices in the existing printing device arrangement during a first specified time and the one or more options for the one or more printing devices in the existing printing device arrangement used during the first specified time;
determining, based upon the printing device usage data and the first printing device cost data for the existing printing device arrangement, actual costs for operating the one or more printing devices in the existing printing device arrangement during the first specified time;
retrieving second printing device attribute data that indicates at least one or more options supported by one or more replacement printing devices that are not included in the existing printing arrangement;

retrieving second printing device cost data that indicates at least costs of printing on the one or more replacement printing devices using the one or more options supported by the one or more replacement printing devices;

a computer system determining an alternative printing device arrangement that has a lower estimated cost of operation during the first specified time than the actual cost of operating the one or more printing devices in the existing printing device arrangement during the first specified time, wherein the estimated cost for operating the alternative printing device arrangement during the first specified time is determined based at least upon the one or more options for the one or more printing devices in the existing printing device arrangement that were used during the first specified time as indicated by the usage data, the second printing device attribute data and the second printing device cost data, wherein the alternative printing device arrangement does not include at least one of the one or more printing devices in the existing printing device arrangement and includes one or more of the one or more replacement printing devices that are not included in the existing printing arrangement, and the computer system storing in a memory data that represents the alternative printing device arrangement.

16. The apparatus as recited in claim 15, wherein the actual costs for operating the one or more printing devices in the existing printing device arrangement during the first specified time include costs attributable to energy consumed by the one or more printing devices during the first specified time and the estimated cost for operating the alternative printing device arrangement is further determined based upon energy that would have been consumed by the alternative printing device arrangement during the first specified time.

17. The apparatus as recited in claim 15, wherein the actual costs for operating the one or more printing devices in the existing printing device arrangement during the first specified time include acquisition costs of the one or more printing devices attributable to the first specified time and the estimated cost for operating the alternative printing device arrangement is further determined based upon acquisition costs of one or more printing devices in the alternative printing device arrangement attributable to the first specified time.

18. The apparatus as recited in claim 15, wherein the estimated cost for operating the alternative printing device arrangement during the first specified time is further determined based upon an estimated cost for operating the one or more of the one or more replacement printing devices during the first specified time.

19. The apparatus as recited in claim 15, wherein one or more of the one or more printing devices in the existing printing device arrangement that are replaced satisfy specified geographic location constraints.

20. The apparatus as recited in claim 19, wherein the specified geographic location constraints include one or more of a maximum distance between printing devices and the printing devices are located on the same floor of a building.

* * * * *